(12) United States Patent
Watabe

(10) Patent No.: US 7,570,556 B2
(45) Date of Patent: Aug. 4, 2009

(54) METHOD AND APPARATUS FOR RECORDING INFORMATION

(75) Inventor: Teruyasu Watabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 673 days.

(21) Appl. No.: 11/294,394

(22) Filed: Dec. 6, 2005

(65) Prior Publication Data

US 2006/0120241 A1 Jun. 8, 2006

(30) Foreign Application Priority Data

Dec. 6, 2004 (JP) ............................ 2004-352114

(51) Int. Cl.
G11B 7/00 (2006.01)
(52) U.S. Cl. ............... 369/47.28; 369/47.53; 369/47.36
(58) Field of Classification Search ........................ None
See application file for complete search history.

(56) References Cited

U.S. PATENT DOCUMENTS

| | | | |
|---|---|---|---|
| 6,459,666 B1 | 10/2002 | Yokoi et al. | |
| 6,842,412 B2 * | 1/2005 | Ushiyama et al. | 369/47.53 |
| 7,177,252 B2 | 2/2007 | Watanabe et al. | |
| 2003/0048711 A1 * | 3/2003 | Hirai | 369/47.39 |

FOREIGN PATENT DOCUMENTS

| | | |
|---|---|---|
| JP | 11-283249 | 10/1999 |
| JP | 2000-082215 | 3/2000 |
| JP | 2001-229564 | 8/2001 |
| JP | 2001-243626 | 9/2001 |
| JP | 2002-197657 | 7/2002 |
| JP | 2002-208139 | 7/2002 |
| JP | 2003-099927 | 4/2003 |
| JP | 2003-281724 | 10/2003 |

* cited by examiner

*Primary Examiner*—Muhammad N. Edun
(74) *Attorney, Agent, or Firm*—Dickstein Shapiro LLP

(57) ABSTRACT

A method and apparatus for recording information with improved capabilities of suitably updating numerous setting items addressing the change in recording velocity of an optical disc caused during information recording. The method for recording on the surface of the optical recording disc by a laser beam emanated from a light source, comprises, in case when a recording velocity changes during an operation of recording information, the step of selecting setting items out of a plurality of items, in which the setting items may affect to a degrade recording quality with the change in the recording velocity and the plurality of items are used for determining the shape of pulsating laser beam; identifying a set of the items to be updated including the setting items; and updating the set item by item to values suitable for the present recording velocity at a predetermined time interval while continuing the operation of recording information. In addition, when the recording velocity changes prior to the step of updating during recording information, the control unit is configured to acquire one by one the values suitable for the present recording velocity, for example, by identifying two neighboring recording velocities interposing the present recording velocity there between, and carrying out either an approximate or interpolation calculation based on the two neighboring recording velocities.

47 Claims, 17 Drawing Sheets

FIG. 6A

| Lm | Ls1 | | | |
|---|---|---|---|---|
| | 3T | 4T | 5T | ≧6T |
| 3T | T1_3S3M | T1_4S3M | T1_5S3M | T1_6S3M |
| 4T | T1_3S4M | T1_4S4M | T1_5S4M | T1_6S4M |
| 5T | T1_3S5M | T1_4S5M | T1_5S5M | T1_6S5M |
| ≧6T | T1_3S6M | T1_4S6M | T1_5S6M | T1_6S6M |

FIG. 6B

| Lm | Ls1 | | | |
|---|---|---|---|---|
| | 3T | 4T | 5T | ≧6T |
| 3T | T2_3S3M | T2_4S3M | T2_5S3M | T2_6S3M |
| 4T | T2_3S4M | T2_4S4M | T2_5S4M | T2_6S4M |
| 5T | T2_3S5M | T2_4S5M | T2_5S5M | T2_6S5M |
| ≧6T | T2_3S6M | T2_4S6M | T2_5S6M | T2_6S6M |

FIG. 6C

| Lm | Ls2 | | | |
|---|---|---|---|---|
| | 3T | 4T | 5T | ≧6T |
| 3T | T3_3S3M | T3_4S3M | T3_5S3M | T3_6S3M |
| 4T | T3_3S4M | T3_4S4M | T3_5S4M | T3_6S4M |
| 5T | T3_3S5M | T3_4S5M | T3_5S5M | T3_6S5M |
| ≧6T | T3_3S6M | T3_4S6M | T3_5S6M | T3_6S6M |

FIG. 6D

| Lm | Ls2 | | | |
|---|---|---|---|---|
| | 3T | 4T | 5T | ≧6T |
| 3T | T4_3S3M | T4_4S3M | T4_5S3M | T4_6S3M |
| 4T | T4_3S4M | T4_4S4M | T4_5S4M | T4_6S4M |
| 5T | T4_3S5M | T4_4S5M | T4_5S5M | T4_6S5M |
| ≧6T | T4_3S6M | T4_4S6M | T4_5S6M | T4_6S6M |

FIG. 7
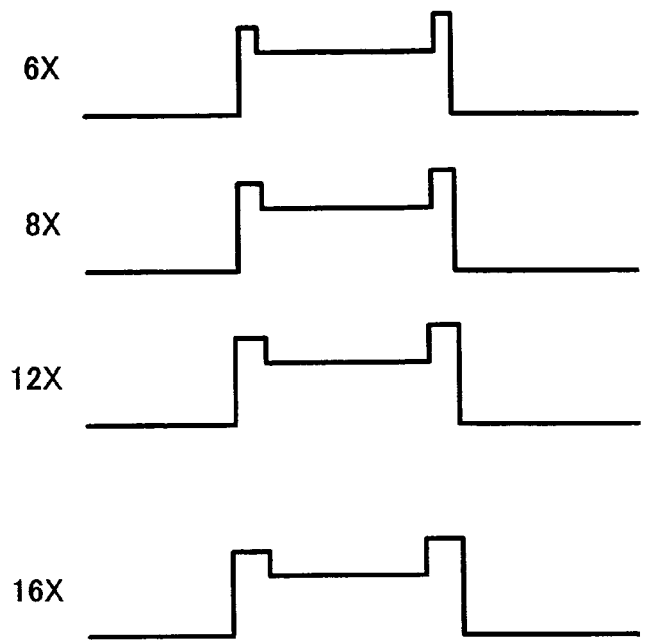
6X
8X
12X
16X
FIG. 8
| S6b \ S6a | 0 | 1 |
|---|---|---|
| 0 | Ib | Imid |
| 1 | Ifr | Irear |
FIG. 9
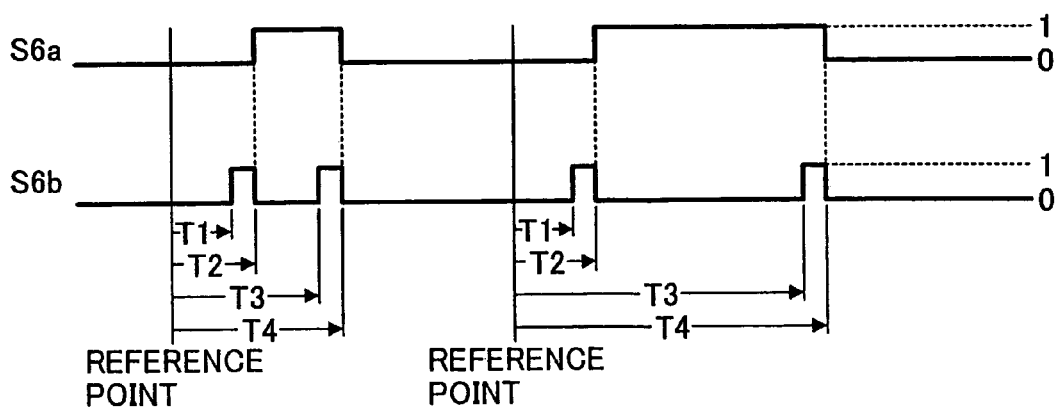

FIG. 14

| SCHEDULE NUMBER | PROCESS CONTENT |
|---|---|
| 1 | ACQUIRE 1ST THROUGH 32ND PIECES OF PULSE WIDTH SETTING INFORMATION SUITABLE FOR PRESENT LINEAR VELOCITY |
| 2 | ACQUIRE 33RD THROUGH 64TH PIECES OF PULSE WIDTH SETTING INFORMATION SUITABLE FOR PRESENT LINEAR VELOCITY |
| 3 | COMPUTE Imid, Ifr, Irear SUITABLE FOR PRESENT LINEAR VELOCITY |
| 4 | SET Ifr IN DRIVE CURRENT SETTING REGISTER |
| 5 | SET Imid IN DRIVE CURRENT SETTING REGISTER |
| 6 | SET Irear IN DRIVE CURRENT SETTING REGISTER |
| 7 | SET 1ST PULSE WIDTH SETTING INFORMATION (T1_3S3M) IN PULSE WIDTH SETTING REGISTER |
| 8 | SET 2ND PULSE WIDTH SETTING INFORMATION (T1_3S4M) IN PULSE WIDTH SETTING REGISTER |
| 9 | SET 3RD PULSE WIDTH SETTING INFORMATION (T1_3S5M) IN PULSE WIDTH SETTING REGISTER |
| 10 | SET 4TH PULSE WIDTH SETTING INFORMATION (T1_3S6M) IN PULSE WIDTH SETTING REGISTER |
| 11 | SET 5TH PULSE WIDTH SETTING INFORMATION (T1_4S3M) IN PULSE WIDTH SETTING REGISTER |
| 12 | SET 6TH PULSE WIDTH SETTING INFORMATION (T1_4S4M) IN PULSE WIDTH SETTING REGISTER |
| . . . | . . . |
| 69 | SET 63RD PULSE WIDTH SETTING INFORMATION (T4_6S5M) IN PULSE WIDTH SETTING REGISTER |
| 70 | SET 64TH PULSE WIDTH SETTING INFORMATION (T4_6S6M) IN PULSE WIDTH SETTING REGISTER |
| 71 | n=0 |

FIG. 17

| SCHEDULE NUMBER | PROCESS CONTENT | |
|---|---|---|
| 1 | ACQUIRE 1ST THROUGH 32ND PIECES OF PULSE WIDTH SETTING INFORMATION SUITABLE FOR PRESENT LINEAR VELOCITY | |
| 2 | ACQUIRE 33RD THROUGH 64TH PIECES OF PULSE WIDTH SETTING INFORMATION SUITABLE FOR PRESENT LINEAR VELOCITY | |
| 3 | COMPUTE Imid, Ifr, Irear SUITABLE FOR PRESENT LINEAR VELOCITY | |
| 4 | SET Ifr IN DRIVE CURRENT SETTING REGISTER | |
| 5 | SET Imid IN DRIVE CURRENT SETTING REGISTER | |
| 6 | SET Irear IN DRIVE CURRENT SETTING REGISTER | |
| 7 | SET 1ST PULSE WIDTH SETTING INFORMATION (T1_3S3M) IN PULSE WIDTH SETTING REGISTER | $Lm=3T, Ls1=3T$ |
| 8 | SET 17TH PULSE WIDTH SETTING INFORMATION (T2_3S3M) IN PULSE WIDTH SETTING REGISTER | |
| 9 | SET 33RD PULSE WIDTH SETTING INFORMATION (T3_3S3M) IN PULSE WIDTH SETTING REGISTER | $Lm=3T, Ls2=3T$ |
| 10 | SET 49TH PULSE WIDTH SETTING INFORMATION (T4_3S3M) IN PULSE WIDTH SETTING REGISTER | |
| 11 | SET 2ND PULSE WIDTH SETTING INFORMATION (T1_3S4M) IN PULSE WIDTH SETTING REGISTER | $Lm=4T, Ls1=3T$ |
| 12 | SET 18TH PULSE WIDTH SETTING INFORMATION (T2_3S4M) IN PULSE WIDTH SETTING REGISTER | |
| 13 | SET 34TH PULSE WIDTH SETTING INFORMATION (T3_3S4M) IN PULSE WIDTH SETTING REGISTER | $Lm=4T, Ls2=3T$ |
| 14 | SET 50TH PULSE WIDTH SETTING INFORMATION (T4_3S4M) IN PULSE WIDTH SETTING REGISTER | |
| ... | ... | |
| 67 | SET 16TH PULSE WIDTH SETTING INFORMATION (T1_6S6M) IN PULSE WIDTH SETTING REGISTER | $Lm\geq 6T, Ls1\geq 6T$ |
| 68 | SET 32ND PULSE WIDTH SETTING INFORMATION (T2_6S6M) IN PULSE WIDTH SETTING REGISTER | |
| 69 | SET 48TH PULSE WIDTH SETTING INFORMATION (T3_6S6M) IN PULSE WIDTH SETTING REGISTER | $Lm\geq 6T, Ls2\geq 6T$ |
| 70 | SET 64TH PULSE WIDTH SETTING INFORMATION (T4_6S6M) IN PULSE WIDTH SETTING REGISTER | |
| 71 | n=0 | |

FIG. 19

| SCHEDULE NUMBER | PROCESS CONTENT |
|---|---|
| 1 | ACQUIRE 1ST THROUGH 32ND PIECES OF PULSE WIDTH SETTING INFORMATION SUITABLE FOR PRESENT LINEAR VELOCITY |
| 2 | ACQUIRE 33RD THROUGH 64TH PIECES OF PULSE WIDTH SETTING INFORMATION SUITABLE FOR PRESENT LINEAR VELOCITY |
| 3 | COMPUTE Imid, Ifr, Irear SUITABLE FOR PRESENT LINEAR VELOCITY |
| 4 | SET Ifr IN DRIVE CURRENT SETTING REGISTER |
| 5 | SET Imid IN DRIVE CURRENT SETTING REGISTER |
| 6 | SET Irear IN DRIVE CURRENT SETTING REGISTER |
| 7 | SET 17TH PULSE WIDTH SETTING INFORMATION (T2_3S3M) IN PULSE WIDTH SETTING REGISTER |
| 8 | SET 18TH PULSE WIDTH SETTING INFORMATION (T2_3S4M) IN PULSE WIDTH SETTING REGISTER |
| ... | ... |
| 53 | SET 63RD PULSE WIDTH SETTING INFORMATION (T4_6S5M) IN PULSE WIDTH SETTING REGISTER |
| 54 | SET 64TH PULSE WIDTH SETTING INFORMATION (T4_6S6M) IN PULSE WIDTH SETTING REGISTER |
| 55 | n=0 |

6X

8X

12X

16X

| SCHEDULE NUMBER | PROCESS CONTENT |
|---|---|
| 1 | COMPUTE Imid, Ifr, Irear SUITABLE FOR PRESENT LINEAR VELOCITY |
| 2 | SET Ifr IN DRIVE CURRENT SETTING REGISTER |
| 3 | SET Imid IN DRIVE CURRENT SETTING REGISTER |
| 4 | SET Irear IN DRIVE CURRENT SETTING REGISTER |
| 5 | n=0 |

FIG. 22A

| FIG. 22 | FIG. 22A |
|---|---|
| | FIG. 22B |

| SCHEDULE NUMBER | PROCESS CONTENT |
|---|---|
| 1 | ACQUIRE 1ST THROUGH 32ND PIECES OF PULSE WIDTH SETTING INFORMATION SUITABLE FOR PRESENT LINEAR VELOCITY |
| 2 | ACQUIRE 33RD THROUGH 64TH PIECES OF PULSE WIDTH SETTING INFORMATION SUITABLE FOR PRESENT LINEAR VELOCITY |
| 3 | COMPUTE Imid, Ifr, Irear SUITABLE FOR PRESENT LINEAR VELOCITY |
| 4 | SET Ifr IN DRIVE CURRENT SETTING REGISTER |
| 5 | SET Imid IN DRIVE CURRENT SETTING REGISTER |
| 6 | SET Irear IN DRIVE CURRENT SETTING REGISTER |
| 7 | SET 1ST PULSE WIDTH SETTING INFORMATION (T1_3S3M) IN PULSE WIDTH SETTING REGISTER |
| 8 | SET 2ND PULSE WIDTH SETTING INFORMATION (T1_3S4M) IN PULSE WIDTH SETTING REGISTER |
| 9 | SET 3RD PULSE WIDTH SETTING INFORMATION (T1_3S5M) IN PULSE WIDTH SETTING REGISTER |
| 10 | SET 4TH PULSE WIDTH SETTING INFORMATION (T1_3S6M) IN PULSE WIDTH SETTING REGISTER |
| 11 | SET 5TH PULSE WIDTH SETTING INFORMATION (T1_4S3M) IN PULSE WIDTH SETTING REGISTER |
| 12 | SET 6TH PULSE WIDTH SETTING INFORMATION (T1_4S4M) IN PULSE WIDTH SETTING REGISTER |
| ... | ... |
| 22 | SET 16TH PULSE WIDTH SETTING INFORMATION (T1_6S6M) IN PULSE WIDTH SETTING REGISTER |
| ... | ... |
| 52 | SET 46TH PULSE WIDTH SETTING INFORMATION (T3_6S4M) IN PULSE WIDTH SETTING REGISTER |
| 53 | SET 47TH PULSE WIDTH SETTING INFORMATION (T3_6S5M) IN PULSE WIDTH SETTING REGISTER |

Rows 7–53 (approximately): 1ST TIME UPDATE

FIG. 22B

| | | |
|---|---|---|
| | SET 48TH PULSE WIDTH SETTING INFORMATION (T3_6S6M) IN PULSE WIDTH SETTING REGISTER | |
| 55 | SET 1ST PULSE WIDTH SETTING INFORMATION (T1_3S3M) IN PULSE WIDTH SETTING REGISTER | ⎫ |
| 56 | SET 2ND PULSE WIDTH SETTING INFORMATION (T1_3S4M) IN PULSE WIDTH SETTING REGISTER | ⎪ |
| 57 | SET 3RD PULSE WIDTH SETTING INFORMATION (T1_3S5M) IN PULSE WIDTH SETTING REGISTER | ⎪ |
| 58 | SET 4TH PULSE WIDTH SETTING INFORMATION (T1_3S6M) IN PULSE WIDTH SETTING REGISTER | ⎬ 2ND TIME UPDATE |
| 59 | SET 5TH PULSE WIDTH SETTING INFORMATION (T1_4S3M) IN PULSE WIDTH SETTING REGISTER | ⎪ |
| 60 | SET 6TH PULSE WIDTH SETTING INFORMATION (T1_4S4M) IN PULSE WIDTH SETTING REGISTER | ⎪ |
| ... | . . . . | |
| 72 | SET 16TH PULSE WIDTH SETTING INFORMATION (T1_6S6M) IN PULSE WIDTH SETTING REGISTER | ⎭ |
| 73 | SET 49TH PULSE WIDTH SETTING INFORMATION (T4_3S3M) IN PULSE WIDTH SETTING REGISTER | |
| ... | . . . . | |
| 85 | SET 63RD PULSE WIDTH SETTING INFORMATION (T4_6S5M) IN PULSE WIDTH SETTING REGISTER | |
| 86 | SET 64TH PULSE WIDTH SETTING INFORMATION (T4_6S6M) IN PULSE WIDTH SETTING REGISTER | |
| 87 | n=0 | |

METHOD AND APPARATUS FOR RECORDING INFORMATION

CROSS-REFERENCE TO RELATED APPLICATIONS

This application claims priority to Japanese Patent Application No. 2004-352114, filed with the Japanese Patent Office on Dec. 6, 2004, the entire contents of which are hereby incorporated by reference.

FIELD OF THE INVENTION

The invention generally relates to methods and apparatuses for recording information, and more specifically to a method and apparatus for recording information with improved capabilities of suitably updating numerous setting items addressing the change in recording velocity of the optical disc caused during information recording.

BACKGROUND OF THE INVENTION

Optical information record/playback systems have come into practical use for viable information data storage. With recent improvements in digital signal processing and data compression technologies, optical discs have been attracting much attention as evidenced by CD (compact disc) and DVD (digital versatile disc), for example, as archival devices of large capacity for recording computer programs, and music and image data. In addition, with a trend for lowering prices optical disc systems are coming into wider use for recording, and playing back (or reproducing) information using the optical discs.

Optical disc systems are generally configured to emit laser beams from a light source; record/erase information by irradiating the laser beams while scanning to form minute spots on a recording surface of an optical disc, which is provided with guiding tracks in the shape of either a spiral or concentric circles; and playback the information by detecting light reflected from the surface of the recording surface.

Incidentally, information on the optical disc is recorded in mark and space regions formed on the disc, which are different in reflectivity with one another. That is, by utilizing the difference in reflectivity in the mark and space regions, and the difference in length of the two regions and the combination thereof, the recording is attained on the optical disc.

Therefore, the power of light beams emitted from a laser device (which is hereafter referred to as power of beam emission or "beam power") is controlled such that mark and space regions are formed respectively in predetermined locations during recording periods.

In regard to so-called recordable discs (or, write once-read many optical discs), which are formed with a recording layer containing organic dye compounds, such as CD-R (CD-recordable), DVD-R (DVD-recordable), and DVD+R (CD+recordable), recording marks are formed by heating with a relatively large beam power by causing the degeneration or decomposition of the dye compounds.

By contrast, space regions are formed without causing the degeneration or decomposition of the dye compounds by a smaller beam power which is comparable to the power during reproducing (or, playing back) periods. The mark regions, therefore, have a reflectivity lower than the space regions.

Incidentally, the beam powers for forming recording marks and space regions are called a recording power and a reproducing power, respectively.

Regarding the formation of the mark regions, the parameters pertinent to the laser beam such as pulse shape, for example, are adjusted according to the rule, called "recording strategy" related to the laser pulse shape, such that the thermal distribution along the track on the disc remains approximately the same even after the change in the length take place for the mark and spaces situated in front and behind of the mark.

In general, a light source drive circuit, which is configured to generate signals for driving the light source, is provided with registers for storing various setting parameters for determining the pulse shape of the driving signals. These parameters are set up in the registers prior to signal recording by means of the serial transmission (according to Japanese Laid-Open Patent Application No. 11-283249, for example).

It is noted that constant linear velocity (CLV) of the information track is achieved by variable angular velocity using higher rotational drive speeds on the inner tracks and lower speeds on the outer tracks. By contrast, CAV (constant angular velocity) mode is cited as another mode for recording information on the optical disc, in which a constant angular velocity of the information track is adopted for recording.

In most practical applications, since recording tracks are accessed randomly from an outer track to an inner track, or vice versa, with such a rapidity that it is quite difficult to adjust the rotation speed to constant linear velocity.

Because of the constant angular velocity, therefore, the CAV mode offers several advantages over the CLV mode such as, recording speeds higher than CLV mode, more ease of controlling the rotation of a spindle motor, and miniaturization of the motor. It is considered in practice that the CAV mode is suitable for downsizing, and reducing weight of, the optical disc recording apparatus.

Since linear drive speeds are lower on the inner tracks, while become higher on the outer tracks in the CAV mode, it is essential to optimize the beam power and the recording strategy addressing to the linear speeds and the change in speed (for example, Japanese Laid-Open Patent Applications No. 2000-82215, 2001-229564, 2002-208139, and 2003-281724).

In addition, with further increases in recording speeds, several difficulties are anticipated, in that the number of setting items, which are required for optimizing the beam power and recording strategy, tends to increase, and that the portion of the machine time of the control unit, which assumes overall control of the optical disc apparatus, is largely preempted by the process of optimizing setting items as long as relying on previous methods and apparatuses disclosed in the above-mentioned applications; and this may adversely affect suitable servo control for the apparatus.

Moreover, although the time required for setting the setting items into the register may be reduced by utilizing the parallel transmission system (data bus, for example), this may result in the increase in costs as well as the size of the optical disc apparatus.

BRIEF SUMMARY OF THE INVENTION

Accordingly, it is an object of this invention to provide a method and apparatus with improved capabilities of recording information having most, if not all, of the advantages and features of similarly employed methods and apparatuses, while reducing or eliminating many of the aforementioned disadvantages.

It is another object to provide a method and apparatus for recording information on an optical recording disc at higher speeds with excellent recorded image qualities without causing the increase in size and costs of the information recording apparatus.

It is still another object to provide a method and apparatus for recording information with improved capabilities of suitably updating numerous setting items addressing the change in recording velocity of the optical disc caused during information recording.

It is another object to provide a computer program product and program storage device for use with a control unit in an information recording apparatus with improved capabilities of suitably updating numerous setting items.

The following description is a synopsis of only selected features and attributes of the present disclosure. A more complete description thereof is found below in the section entitled "Description of the Preferred Embodiments."

The above and other object of the invention are achieved by providing a method for recording information on the surface of an optical recording disc by a pulsating laser beam emanated from a light source incorporated into an information recording apparatus, comprising the steps of, in case when a recording velocity changes during an operation of recording information, selecting setting items out of a plurality of items, in which the setting items may affect to degrade recording quality with the change in the recording velocity and the plurality of items are used for determining the shape of pulsating laser beam;

identifying a set of items to be updated including the setting items; and updating the set item by item to the values suitable for the present recording velocity at a predetermined time interval while continuing the operation of recording information.

In addition, the method of the invention may further comprise, in case when the recording velocity changes prior to the step of updating during the operation of recording information, the step of acquiring one by one the values suitable for the present recording velocity concerning to the items to be updated while continuing the operation of recording information. And, the abovementioned step of acquiring one by one the values suitable for the present recording velocity is performed a plurality of times not consecutively but separated with one another at the predetermined time interval.

According to another aspect, a computer program product for use with the information recording apparatus is provided, including computer readable program code means comprising register means for storing a plurality of values of setting items for determining the pulse shape of light beam;

signal generation means for generating drive signals for a light source based on information stored in the register means and recorded on the surface of an optical recording disc; and control means, in case when a recording velocity changes during the operation of recording information, for selecting setting items, which affect to degrade recording quality out of a plurality of items;

identifying a set of items to be updated including the setting items; and updating the set item by item to the values suitable for the present recording velocity at a predetermined time interval while continuing the operation of recording information.

In addition, the computer readable program code means further includes control means, in case when the recording velocity changes prior to the step of updating during the operation of recording information, for acquiring one by one the values suitable for the present recording velocity concerning to the items to be updated while continuing the operation of recording information.

According to still another aspect, a recording medium readable by a machine is disclosed, tangibly embodying program of instructions executable by the machine to perform method steps of recording information, which are specified by the abovementioned computer program product.

According to another aspect, an information recording apparatus configured to record information on the surface of an optical recording disc is provided, comprising an optical pickup unit comprising a light source and an optical system configured to condense a light beam on the surface of the optical recording disc, several registers configured to store a plurality of setting items for determining the pulse shape of the light beam;

a signal generation circuit configured to generate drive signals for the light source based on information stored in the registers and recorded on the surface of the optical recording disc; and a control unit configured, in case when a recording velocity changes during the operation of recording information, to select setting items out of a plurality of items which affects to degrade recording quality;

identify a set of items to be updated including the setting items; and update the set item by item to values suitable for the present recording velocity at a predetermined time interval while continuing the operation of recording information.

In addition, the control unit is configured, in case when the recording velocity changes prior to the step of updating during the operation of recording information, to acquire one by one the values suitable for the present recording velocity concerning to the items to be updated while continuing the operation of recording information. And, the control unit is also configured to acquire one by one the values suitable for the present recording velocity a plurality of times not consecutively but separated with one another at the predetermined time interval.

These and other features and advantages of the invention will be more clearly seen from the following detailed description of the invention which is provided in connection with the accompanying drawings.

BRIEF DESCRIPTION OF THE DRAWINGS

FIGS. 6A through 6D are tables including the pieces of pulse width setting information for the period of time T1 from a reference point to the rising time of front boot pulse, T2 from the reference point to the falling time of the pulse, T3 the time to rising time of end boot pulse, T4 the time to the falling time of the pulse, respectively;

FIG. 7 includes drawings illustrating the change in suitable values of both pulse width setting information and driving current setting information for different linear recording speeds;

FIG. 8 is a decision table illustrating the selection by the multiplexer of FIG. 3 regarding the emission timing signals and driving current setting information;

FIG. 9 includes a timing diagram illustrating emission timing signals output from the sequencer of FIG. 3;

FIG. 14 includes a schedule table containing the process contents implemented during update process according to one embodiment of the invention;

FIG. 17 includes a schedule table containing the process contents implemented during update process for the values of pulse width setting information having the same length of the space immediately before and after the recording mark;

FIG. 19 includes another schedule table containing the process contents implemented during update process for the values of pulse width setting information in the case where the period of time T1 is the same for plural recording speeds and some of the values of pulse width setting information can be excluded from updating;

FIG. 22 includes another schedule table containing the process contents implemented during update process, in which the update process is implemented several times when the difference in time period T1 between before and after the update process exceeds an upper limit.

DETAILED DESCRIPTION OF THE INVENTION

Figure 1:
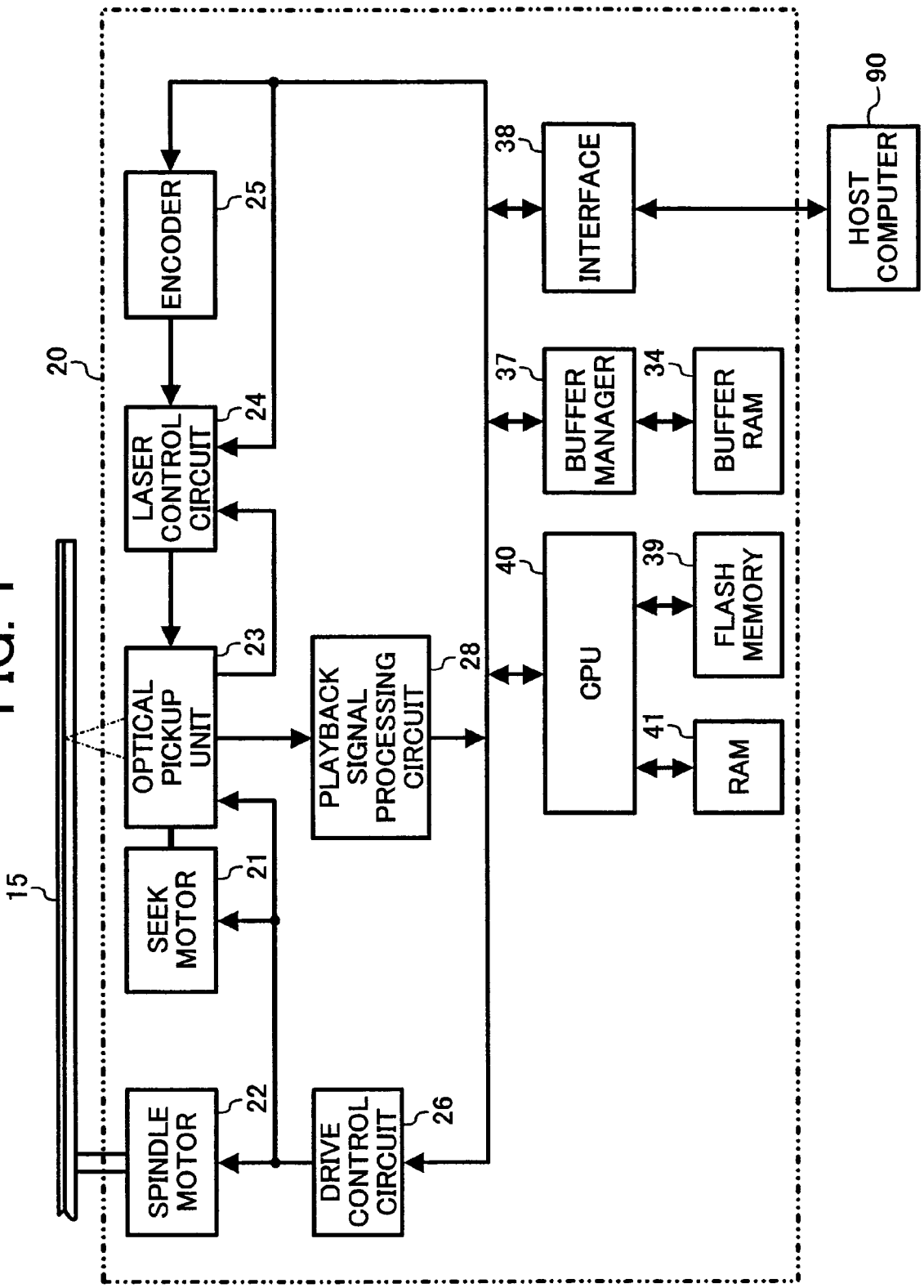
FIG. 1 is a block diagram diagrammatically illustrating an information recording system serving as an optical disc apparatus according to one embodiment of the invention.

In the detailed description which follows, specific embodiments of methods and apparatuses for recording information with improved capabilities of suitably updating numerous setting items are described.

It is understood, however, that the present disclosure is not limited to these embodiments. For example, it is appreciated that the present method and apparatus may also be adaptable to any form of information recording. Other embodiments will be apparent to those skilled in the art upon reading the following description.

In addition, in the description that follows specific terminology is used in many instances for the sake of clarity. However, the disclosure of this patent specification is not intended to be limited to the specific terminology so selected and it is to be understood that each specific element includes all technical equivalents that operate in a similar manner.

According to one embodiment in the present disclosure, a method for recording information on the surface of an optical recording disc by a pulsating laser beam emanated from a light source incorporated into an information recording apparatus includes at least the steps of selecting setting items out of a plurality of items,
identifying a set of items to be updated including the setting items, and
updating the set item by item.

The step of selecting setting items includes, in case when a recording velocity changes during an operation of recording information, selecting setting items out of a plurality of items, in which the setting items may affect to degrade recording quality with the change in the recording velocity and the plurality of items are used for determining the pulse shape of laser beam.

The step of identifying includes identifying a set of the items to be updated including the setting items, and the step of updating includes updating the set item by item to the values suitable for the present recording velocity at a predetermined time interval while continuing the operation of recording information.

In addition, the step of updating may further include at least one of (a) updating a first group of the items in the set in succession when the first group of the items in the set are referred to at the same time during the operation of recording information, (b) updating a second group of the items in the set item by item taking precedence over other items when the second group of the items in the set are referred to with a higher frequency during the operation of recording information, and (c) carrying out by identifying a third group of the items in the set, which result in a first amount of the change caused by the step of updating larger than a predetermined upper limit, and updating the third group of the items a plurality of times such that a second amount of the change caused in each of the plurality of times is smaller than the predetermined upper limit.

It may be noted in the present embodiment that the above-mentioned set of items to be updated contain either first plural items related to driving current or second plural items related to pulse width, and the optical recording disc is configured to rotate at a constant angular velocity.

According to the abovementioned steps, in the case when a recording velocity changes during an operation of recording information, several items are selected out of a plurality of setting items as the items affecting to degrade recording quality with the change in the recording velocity.

Thereafter, a set of the items are identified to be updated including the setting items, and updated item by item to the values suitable for the present recording velocity at a predetermined time interval while continuing the operation of recording information.

As a result, even when the values of setting items are serially transferred, it becomes feasible for the CPU to monitor various portions of the apparatus in proper timing to detect and then prevent, if necessary, any undue status such as, for example, failure in servo control of the apparatus during recording. And, the recording process can be carried out at higher speeds with excellent image qualities without causing the increase in size and costs of the apparatus.

In addition, the step of acquiring includes, in case when the recording velocity changes prior to the step of updating during the operation of recording information, acquiring one by one the values suitable for the present recording velocity concerning to the items to be updated while continuing the operation of recording information.

Also, in case when the recording velocity changes prior to the step of updating during the operation of recording information, the step of acquiring may further include at least one of (a) acquiring one by one the values suitable for the present recording velocity a plurality of times not consecutively but separated with one another at the predetermined time interval, and (b) in case when the values suitable for the present recording velocity are previously acquired as a set of known recording velocities and when a recording velocity is presently different from each of the set of known recording velocities, acquiring one by one the values suitable for the present recording velocity by identifying two neighboring recording velocities interposing the present recording velocity there between, and carrying out either an approximate calculation or an interpolation calculation based on the values suitable for the two neighboring recording velocities.

According to these steps, the values suitable for the present recording velocity are previously acquired as a set of known recording velocities. And, when a recording velocity is presently different from each of the set of known recording velocities, the values for the setting items suitable for the present recording velocity can be computed based on two neighboring recording velocities by approximate calculation or interpolation calculation.

As a result, even in case when the recording velocity changes prior to the step of updating during the operation of recording information, it becomes feasible for the CPU to suitably update necessary setting items, monitor various portions of the apparatus in proper timing for the detection, and prevent the undue status of the apparatus during recording.

According to another aspect, a computer program product for use with the information recording apparatus is provided.

The computer program product includes computer readable program code means comprises register means, signal generation means, and control means.

The register means is for storing a plurality of values of setting items for determining the pulse shape of light beam; the signal generation means is for generating drive signals for a light source based on information stored in the register means and recorded on the surface of an optical recording disc; and the control means is, in case when a recording velocity changes during the operation of recording information, for selecting setting items, which may affect to degrade recording quality, out of a plurality of items;

identifying a set of items to be updated including the setting items; and updating the set item by item to the values suitable for the present recording velocity at a predetermined time interval while continuing the operation of recording information.

In addition, the computer readable program code means may includes further control means, which is, in case when the recording velocity changes prior to the step of updating during the operation of recording information, for acquiring one by one the values suitable for the present recording velocity concerning to the items to be updated while continuing the operation of recording information.

The computer program product is configured, upon loaded into a specified memory of the program product and leading addresses of which being set in the program counter, for the control unit in information recording apparatus to select setting items out of a plurality of items which affect to degrade recording quality; identify a set of items to be updated including the setting items; and update the set item by item to the values suitable for the present recording velocity at a predetermined time interval while continuing the operation of recording information, in case when a recording velocity changes during the operation of recording information.

By means of the present computer program product, therefore, the process steps included in the abovementioned method can suitably be implemented, whereby it becomes feasible for the image recording apparatus to implement information recording on optical recording discs at higher speeds with excellent recorded image qualities.

In addition, a recording medium readable by a machine is disclosed, tangibly embodying program of instructions executable by the machine to perform the method steps of recording information, which are specified by the abovementioned computer program product.

By means of the recording medium capable of storing these method steps, the image recording can be carried out on optical recording discs at higher speeds with excellent recorded image qualities without causing the increase in size and costs of the apparatus.

According to still another aspect, an information recording apparatus configured to record information on the surface of an optical recording disc is provided, comprising an optical pickup unit, plural registers, a signal generation circuit, and a control unit.

The optical pickup unit comprising a light source and an optical system is configured to condense a light beam on the surface of the optical recording disc.

The plural registers are configured to store a plurality of values of setting items for determining the pulse shape of the light beam.

The signal generation circuit is configured to generate drive signals for driving the light source based on information stored in the registers and recorded on the surface of the optical recording disc.

The control unit is configured, in case when a recording velocity changes during the operation of recording information, to select setting items out of a plurality of items which affects to degrade recording quality; identify a set of items to be updated including the setting items; and update the set item by item to the values suitable for the present recording velocity at a predetermined time interval while continuing the operation of recording information.

In addition, the control unit is also configured to (a) update a first group of the items in the set in succession when the first group of items in the set are referred to at the same time during the operation of recording information, (b) update a second group of the items in the set item by item taking precedence over other items when the second group of items in the set are referred to with a higher frequency during the operation of recording information, and (c) carry out by identifying a third group of the items in the set, which result in a first amount of the change caused by the step of updating larger than a predetermined upper limit, and updating the third group of items a plurality of times such that a second amount of the change caused in each of the plurality of times is smaller than the predetermined upper limit.

Still in addition, in case when the recording velocity changes prior to the step of updating during the operation of recording information, the control unit is also configured to (a) acquire one by one the values suitable for the present recording velocity a plurality of times not consecutively but separated with one another at the predetermined time interval, and (b) in case when the values suitable for the present recording velocity are previously acquired as a set of known recording velocities and when a recording velocity is presently different from each of the set of known recording velocities, acquire one by one the values suitable for the present recording velocity by identifying two neighboring recording velocities interposing the present recording velocity there between, and carrying out either an approximate calculation or an interpolation calculation based on the values suitable for the two neighboring recording velocities.

In addition, if the optical recording disc is identified as an unknown medium based on recording characteristics information, the control unit is configured to acquire one by one the values suitable for the present recording velocity based on recoding conditions previously recorded in the optical recording disc.

Upon receiving a record command from a host computer, a signal generation circuit in the information recording apparatus is configured to generate signals for diving the laser source based on information stored in the registers and recorded on the surface of the optical recording disc, whereby a light beam is emitted from the laser source, condensed on the recording surface of the optical disc, and recording process is initiated.

In case when a recording velocity changes during the operation of recording information, the control unit in the information recording apparatus is configured to select setting items out of a plurality of items which may affect to degrade recording quality, identify a set of items to be updated including the setting items, and update the set item by item to values suitable for the present recording velocity at a predetermined time interval while continuing the operation of recording information.

As a result, even when the values of setting items are serially transferred, it becomes feasible for the CPU to suitably monitor various portions of the apparatus in proper timing to detect and prevent, if necessary, any undue status such as, for example, failure in servo control of the apparatus. Then, the recording process can be carried out at higher speeds with excellent recorded image qualities without causing the increase in size and costs of the apparatus.

Having described the present disclosure in general, an exemplary embodiment of information recording apparatus will be described herein below according to the present invention with reference to FIGS. 1 through 16. As the information recording apparatus an optical disc apparatus will be primarily related herein below.

FIG. 1 is a drawing diagrammatically illustrating the overall view of an optical disc apparatus 20.

Referring to FIG. 1, the optical disc apparatus 20 includes at least a spindle motor 22 for rotating an optical disc 15, an optical pickup unit 23, a seek motor 21 for driving the optical pickup unit 23 in the sledge direction, a laser control circuit 24 serving as a signal generation circuit, an encoder 25, a drive control circuit 26, a playback signal processing circuit 28, a buffer RAM 34, a buffer manager 37, an interface 38, a flash memory 39, a CPU 40, and a RAM 41.

It may be added that the arrows in FIG. 1 indicate the flow of typical signals and information and do not necessarily indicate all connections between the blocks, and optical discs conforming to the DVD+R standards are primarily utilized in the present embodiment.

The optical pickup unit 23 is adapted to guide a laser beam to be condensed onto a recording surface of optical disc 15, which is provided in advance with guiding tracks in the shape of either a spiral or concentric circles, and to receive the beam reflected from the recording surface.

Figure 2:
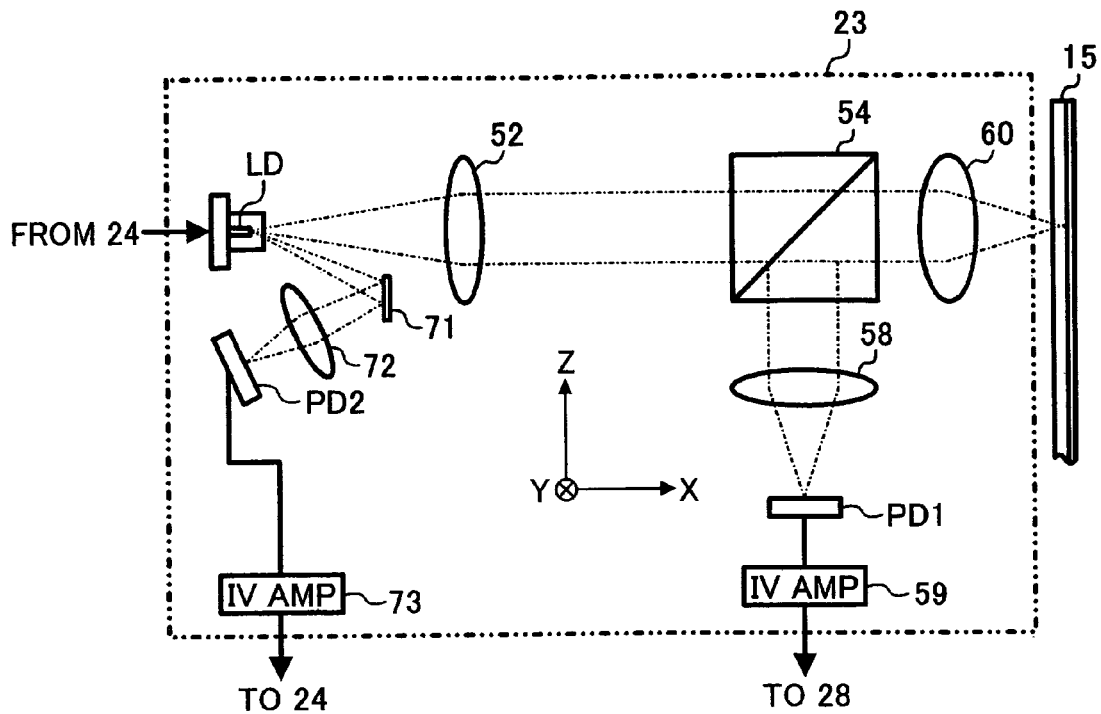
FIG. 2 is a schematic diagram illustrating the optical pickup unit included in the optical disc apparatus of FIG. 1.

As illustrated in FIG. 2, the optical pickup unit 23 includes at least a laser light source LD, a collimator lens 52, a beam splitter 54, an objective lens 60, two detection lenses 58 and 72, two photodetectors PD1 and PD2, a reflecting mirror 71, two IV amplifiers 59 and 73, and a driving system (not shown) for driving the objective lens 60.

A semiconductor laser device emanating light beams at a wavelength of 660 nm serves as the laser source LD. In the present illustration, the +X direction in FIG. 2 represents the direction of light beam emission with the highest intensity.

The collimator lens 52 is placed on the +X side of the laser source LD (FIG. 2) and makes the light beams emitted from the source LD to be approximately in parallel.

Placed on the +X side of the collimator lens 52 is the beam splitter 54 which serves to split the beams reflected by optical disc 15 (return beams) in the −Z direction (FIG. 2).

The objective lens 60 is placed on the +X side of the beam splitter 54, and adapted to focus the beams passing through the beam splitter 54 onto the recording surface of the optical disc 15.

The detection lens 58 is placed on the −Z side of the beam splitter 54, and adapted to focus the light beams previously split by the beam splitter 54 (return beams) onto a photosensitive surface of the photodetector PD1.

In similar manner to a conventional optical disc apparatus, the photodetector PD1 is provided with several photoreceptor elements which are each adapted to output signals containing information on wobble signals, playback data, focus error, and track error.

The photoreceptor elements are each adapted to generate output signals generated through photoelectric conversion corresponding to the amount of light received.

The reflecting mirror 71 is placed in the vicinity of the collimator lens 52 such that a portion of the light beams emitted from the light source LD is reflected in the direction of the photoreceptor surface of the photodetector PD2.

The detection lens 72 is placed between reflecting mirror 71 and photodetector PD2, and adapted to condense light beams for monitoring reflected from the reflecting mirror 71.

As to the photodetector PD2, a conventional photoreceptor can be used.

The IV amplifier 59 is configured to convert each of the output signals (i.e., several photoelectric conversion signals) from the photodetector PD1 into voltage signals and amplify at a predetermined gain.

Following the conversion and amplification by the IV amplifier 59 the resultant signals are output to the playback signal processing circuit 28.

The IV amplifier 73 is configured to convert the output signals (photoelectric conversion signals) from the photodetector PD2 into voltage signals and amplify at another predetermined gain.

Following the conversion and amplification by the IV amplifier 73 the resultant signals are output to the laser control circuit 24 to serve as monitoring signals.

The driving system (not shown) is provided at least with a focusing actuator for driving for driving the objective lens 60 minutely in its focusing direction (along the optical axis), and a tracking actuator for driving the lens 60 also minutely in the tracking direction (in the direction orthogonal to the tangent of the guide track).

Referring again to FIG. 1, the playback signal processing circuit 28 is configured to acquire servo signals (including focus error and track error signals), address information, RF signals (playback signals) and other similar signals, and to generate several clock signals including channel clock signals.

The servo signals are output to the drive control circuit 26, the address information to CPU 40, and the channel clock signals to the encoder 25, respectively.

In addition, the playback signal processing circuit 28 is further configured to perform several operations on the RF signals such as demodulation and error detection. In the case when any error is detected, the processing circuit 28 performs error correction processing and thereafter stores resultant signals in the buffer RAM 34 as playback signals by way of the buffer manager 37.

The drive control circuit 26 is configured to generate driving signals to be supplied to the tracking actuator for correcting positional discrepancy of the objective lens 60 based on track error signals output from the playback signal processing circuit 28, and generate further driving signals to the focusing actuator for correcting focus discrepancy of the lens 60 based on focus error signals.

These driving signals are output to the optical pickup unit 23. The tracking and focusing controls are then carried out by these signals.

In addition, the drive control circuit 26 is further configured to generate signals for driving the seek motor 21 and spindle motor 22 based on the instruction by CPU 40, and subsequently output to the motors 21 and 22, respectively.

The buffer RAM 34 is adapted to temporarily store the data to be recorded in the optical disc 15 (recording data) and further data played back from optical disc 15 (reproduced data). The input/output steps with the buffer RAM 34 are managed by the buffer manager 37.

The encoder 25 is adapted to generate data to be recorded on the optical disc 15 by retrieving the recording data stored in the buffer RAM 34 by way of buffer manager 37, carrying out data modulation (eight to sixteen modulation herein), and affixing error correction codes. Thus generated recording signals are output to laser control circuit 24 together with the channel clock signals.

The interface 38 herein used is one of the two-way communication interfaces between a host computer 90 (e.g., personal computer) in compliance with the standard interface such as ATAPI (AT Attachment Packet Interface), SCSI (Small computer System Interface), and USB (Universal Serial Bus).

The flash memory 39 is configured to include program and data regions. The program region stores various programs including the programs described in the codes readable by the CPU 40 according to the invention.

In addition, the data region stores various characteristics including I-L (current vs. luminosity) characteristics of the laser source LD, recording/reproducing conditions for various kinds of recording media, and schedule tables referred to during updating process which will be detailed later on.

The CPU 40 assumes the overall control of the optical disc apparatus based on the programs stored in the program region in the flash memory 39 and instructs to store the data necessary for the control in RAM 41 and buffer RAM 34.

The laser control circuit 24 is configured to generate the signals for driving the laser source LD.

Figure 3:
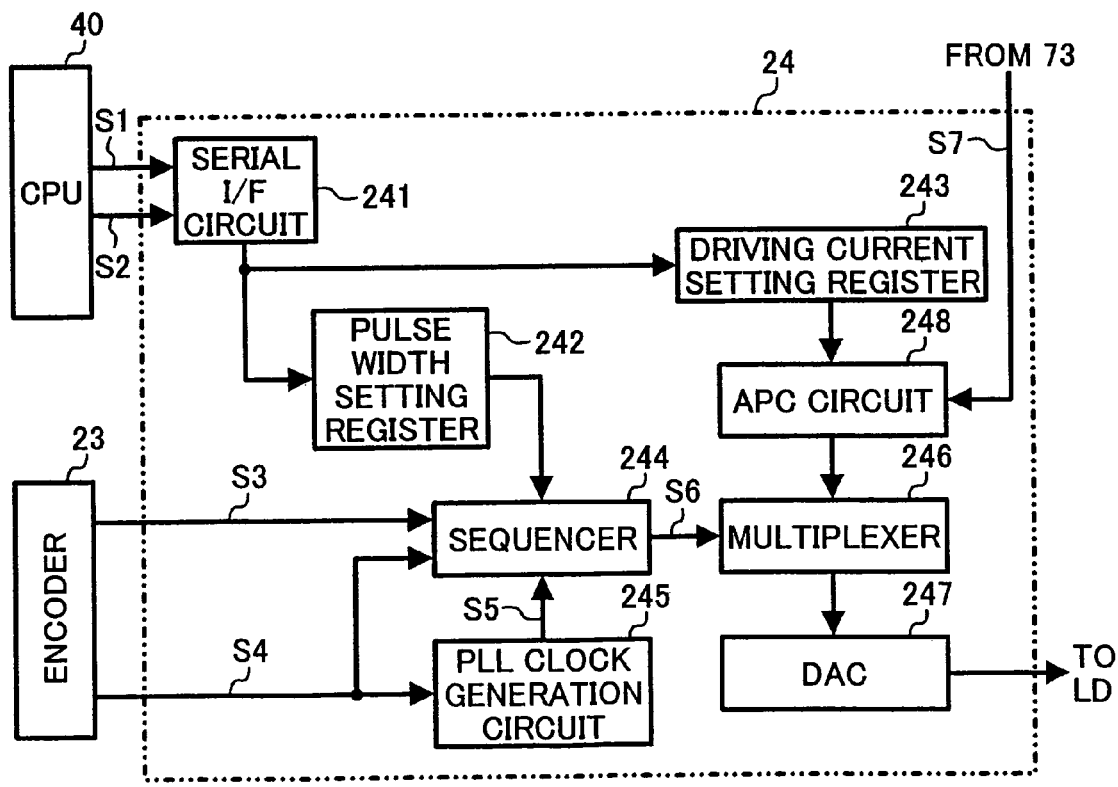
FIG. 3 is a block diagram diagrammatically illustrating the laser control unit included in the optical disc apparatus of FIG. 1.

As illustrated in FIG. 3, the laser control circuit 24 includes at least a serial I/F circuit 241, a pulse width setting register 242, a driving current setting register 243, a sequencer 244, a PLL (phase-locked loop) clock generation circuit 245, a multiplexer 246, a DAC (digital to analog converter) 247, and an APC (automatic power control) circuit 248.

The serial I/F circuit 241 is configured to control the serial communication between CPU 40. The serial I/F circuit 241 receives serial data S2 from the CPU 40 in synchronous with serial clock signals S1. The serial data S2 contains pulse width setting information and driving current setting information.

The serial I/F circuit 241 is adapted to set the pulse width setting information in the pulse width setting register 242, and set the driving current setting information in the driving current setting register 243.

It may be added that the serial clock signals S1 are generated by CPU 40 according to serial transmission speeds.

The PLL clock generation circuit 245 generates sub-clock signals S5 by multiplying the channel clock signals S4. For example, there assumed herein are a multiplication factor of 40 by PLL clock generation circuit 245 and 26 MHz as the frequency of sub-clock signals S5. This result in the frequency of 1.04 GHz of the sub-clock signals S5. Thus generated sub-clock signals S5 are output to the sequencer 244.

The sequencer 244 determines the shape of pulse based on the recording signals S3 output from encoder 25, pulse width setting values set in the pulse width setting register 242, channel clock signals S4, and sub-clock signals S5. According to thus determined pulse shapes, the sequencer 244 generates emission timing signals S6.

In the next place, a description on recording strategy will be provided herein below.

Figure 4:
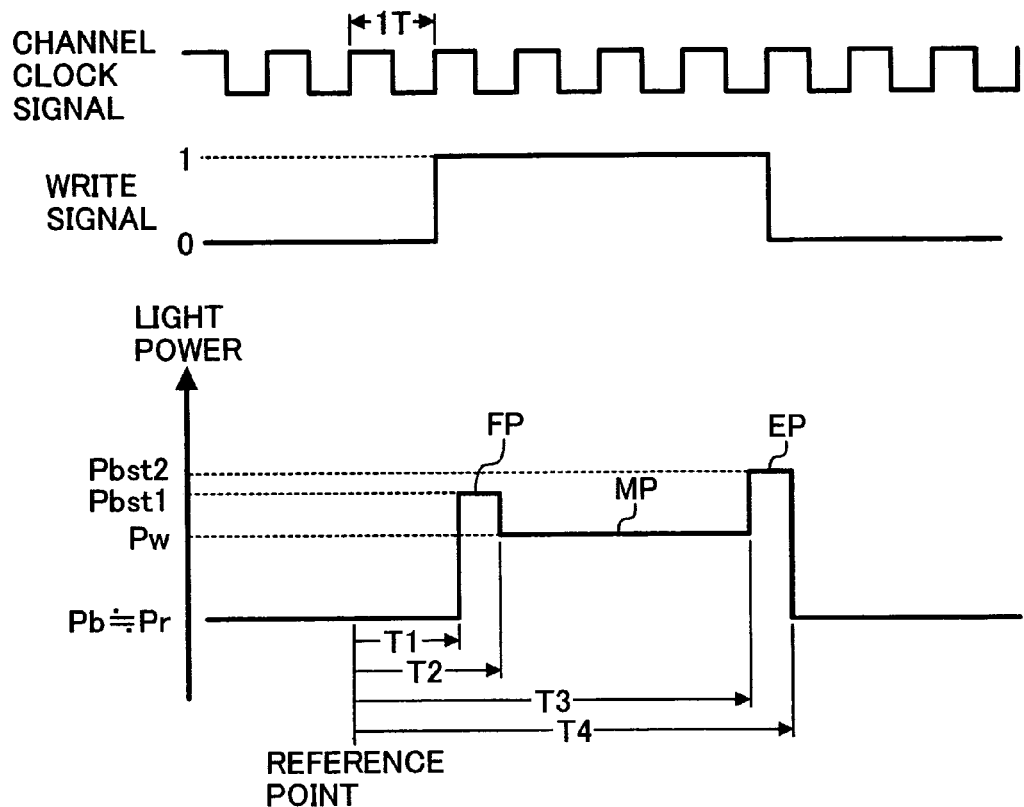
FIG. 4 includes drawings diagrammatically illustrating the shape, and the timing of several pulses utilized for the recording strategy employed in the optical disc apparatus according to one embodiment of the invention, in which a heating pulse used for forming a recording mark is assumed as composed of three component pulses, a front boot pulse, a middle pulse, and an end pulse.
Figure 5:
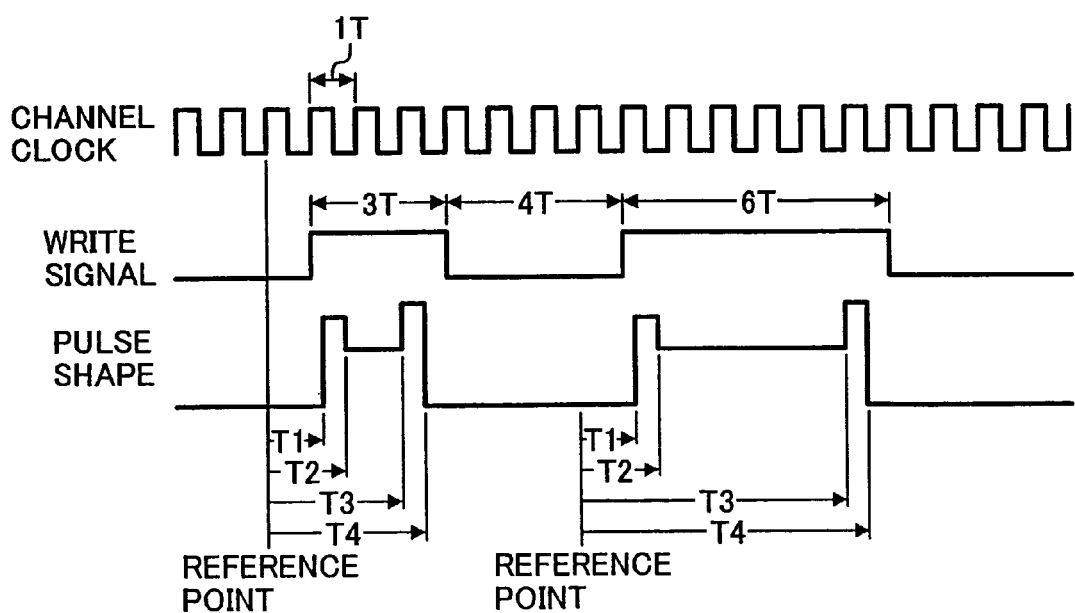
FIG. 5 includes drawings diagrammatically illustrating the shape, and the timing of several pulses utilized for the recording strategy employed in the optical disc apparatus according to one embodiment of the invention, including details of the length of recording mark, and that of spaces immediately before and after the mark, which are related to heat storage conditions of the optical disc.

In the present embodiment, the so-called castle-strategy is utilized as illustrated in FIGS. 4 and 5, in which a predetermined power is superposed on the portion(s) of recording power Pw corresponding to recording mark (for example, front and end portions in the present case).

For example, a heating pulse used for forming a mark is assumed herein as formed of three component pulses, a front boot pulse FP, a middle pulse MP, and an end boot pulse EP.

Also assumed are the emission power for the front boot pulse FP as front boot power Pbst1, for the middle pulse MP as middle power Pw (which is equal to the recording power), and for the end pulse EP as end boot power Pbst2, respectively. In addition, the emission power for forming a space portion (or, bottom power) Pb is assumed to be approximately equal to the reproducing power Pr.

Further assumed as shown in FIG. 3 are the time T1 (in the sub-clock unit) as the time from a reference point (which is set preceding the rising time of the recording signal) to the rising time of front boot pulse FP, T2 as the time from the reference point to the falling time of pulse FP, T3 as the time to rising time of end boot pulse EP, and T4 as the time to the falling time of pulse EP.

The pulse widths are therefore determined by the time interval T2−T1 for the front boot pulse FP, T3−T2 for the middle pulse MP, and T4−T3 for the end boot pulse EP, respectively.

Therefore, the values T1, T2, T3, and T4 constitute the aforementioned pulse width setting information.

It is noted that the accuracy of pulse width setting information is determined depending on the period of the sub-clock pulses.

In addition, while the reference point is taken in the present embodiment as the point preceding the rising time of the recording signal by 1T (T being the period of the channel clock), it is not intended to be limiting. The reference point may be taken alternatively as another point preceding by 2T, for example.

In general, the conditions of heat storage are different on the recording surface of optical disc during the formation of recording marks depending not only on the length of mark (i.e., Lm) but also on the length of the space immediately before the mark (Ls1) and the length immediately after the mark (Ls2).

Subsequently, the following assumption is made for further discussion.

Namely, T1 and T2 are set, for example, according to the length Lm of mark and the length Ls1 of the space immediately before the mark, while T3 and T4 are set according to Lm and the length Ls2 of the space immediately after the mark.

Moreover, the mark length Lm is examined in four cases of 3T, 4T, 5T, and 6T or larger. Similarly, the length Ls2 of the space immediately after the mark is examined also in four cases of 3T, 4T, 5T, and 6T or larger.

Accordingly, the following sixteen cases are considered regarding setting values for the parameter T1.

That is, the cases of
Lm=3T and Ls1=3T (denoted by T1_3S3M),
Lm=4T and Ls1=3T (denoted by T1_3S4M),
Lm=5T and Ls1=3T (denoted by T1_3S5M),
Lm≧6T and Ls1=3T (denoted by T1_3S6M),
Lm=3T and Ls1=4T (denoted by T1_4S3M),
Lm=4T and Ls1=4T (denoted by T1_4S4M),
Lm=5T and Ls1=4T (denoted by T1_4S5M),
Lm≧6T and Ls1=4T (denoted by T1_4S6M),
Lm=3T and Ls1=5T (denoted by T1_5S3M),
Lm=4T and Ls1=5T (denoted by T1_5S4M),
Lm=5T and Ls1=5T (denoted by T1_5S5M),
Lm≧6T and Ls1=5T (denoted by T1_5S6M),
Lm=3T and Ls1≧6T (denoted by T1_6S3M),
Lm=4T and Ls1≧6T (denoted by T1_6S4M),
Lm=5T and Ls1≧6T (denoted by T1_6S5M), and
Lm≧6T and Ls1≧6T (denoted by T1_6S6M), as summarized in FIG. 6A.

Alternatively, in the present embodiment these cases are also expressed for convenience, as follows.

Namely, the term T1_3S3M is expressed as a first pulse width setting information, T1_3S4M as a second pulse width setting information,
T1_3S5M as a third pulse width setting information,
T1_3S6M as a fourth pulse width setting information,
T1_4S3M as a fifth pulse width setting information,
T1_4S4M as a sixth pulse width setting information,
T1_4S5M as a seventh pulse width setting information,
T1_4S6M as an eighth pulse width setting information,
T1_5S3M as a ninth pulse width setting information,
T1_5S4M as a tenth pulse width setting information,
T1_5S5M as an eleventh pulse width setting information,
T1_5S6M as a twelfth pulse width setting information,
T1_6S3M as a thirteenth pulse width setting information,
T1_6S4M as a fourteenth pulse width setting information,
T1_6S5M as a fifteenth pulse width setting information, and
T1_6S6M as a sixteenth pulse width setting information.

For the parameter T2, the following sixteen cases are considered concerning its setting values.

Namely, the cases of Lm=3T and Ls1=3T (denoted by T2_3S3M), Lm=4T and Ls1=3T (denoted by T2_3S4M), Lm=5T and Ls1=3T (denoted by T2_3S5M), Lm≧6T and Ls1=3T (denoted by T2_3S6M), Lm=3T and Ls1=4T (denoted by T2_4S3M), Lm=4T and Ls1=4T (denoted by T2_4S4M), Lm=5T and Ls1=4T (denoted by T2_4S5M), Lm≧6T and Ls1=4T (denoted by T2_4S6M), Lm=3T and Ls1=5T (denoted by T2_5S3M), Lm=4T and Ls1=5T (denoted by T2_5S4M), Lm=5T and Ls1=5T (denoted by T2_5S5M), Lm≧6T and Ls1=5T (denoted by T2_5S6M), Lm=3T and Ls1≧6T (denoted by T2_6S3M), Lm=4T and Ls1≧6T (denoted by T2_6S4M), Lm=5T and Ls1≧6T (denoted by T2_6S5M), and Lm≧6T and Ls1≧6T (denoted by T2_6S6M), as summarized in FIG. 6B.

Alternatively, these cases are also expressed for convenience, as follows.

That is, the term T2_3S3M is expressed as a seventeenth pulse width setting information, T2_3S4M as an eighteenth pulse width setting information, T2_3S5M as a nineteenth pulse width setting information, T2_3S6M as a twentieth pulse width setting information, T2_4S3M as a twenty-first pulse width setting information, T2_4S4M as a twenty-second pulse width setting information, T2_4S5M as a twenty-third pulse width setting information, T2_4S6M as a twenty-fourth pulse width setting information, T2_5S3M as a twenty-fifth pulse width setting information, T2_5S4M as a twenty-sixth pulse width setting information, T2_5S5M as a twenty-seventh pulse width setting information, T2_5S6M as a twenty-eighth pulse width setting information, T2_6S3M as a twenty-ninth pulse width setting information, T2_6S4M as a thirtieth pulse width setting information, T2_6S5M as a thirty-first pulse width setting information, and T2_6S6M as a thirty-second pulse width setting information.

For the parameter T3, the following sixteen cases are considered concerning its setting values.

Namely, the cases of Lm=3T and Ls2=3T (denoted by T3_3S3M), Lm=4T and Ls2=3T (denoted by T3_3S4M), Lm=5T and Ls2=3T (denoted by T3_3S5M), Lm2_6T and Ls2=3T (denoted by T3_3S6M), Lm=3T and Ls2=4T (denoted by T3_4S3M), Lm=4T and Ls2=4T (denoted by T3_4S4M), Lm=5T and Ls2=4T (denoted by T3_4S5M), Lm≧6T and Ls2=4T (denoted by T3_4S6M), Lm=3T and Ls2=5T (denoted by T3_5S3M), Lm=4T and Ls2=5T (denoted by T3_5S4M), Lm=5T and Ls2=5T (denoted by T3_5S5M), Lm≧6T and Ls2=5T (denoted by T3_5S6M), Lm=3T and Ls2≧6T (denoted by T3_6S3M), Lm=4T and Ls2≧6T (denoted by T3_6S4M), Lm=5T and Ls2≧6T (denoted by T3_6S5M), and Lm≧6T and Ls2≧6T (denoted by T3_6S6M), as summarized in FIG. 6C.

Alternatively, these cases are also expressed for convenience, as follows. That is, the term T3_3S3M is expressed as a thirty-third pulse width setting information, T3_3S4M as a thirty-fourth pulse width setting information, T3_3S5M as a thirty-fifth pulse width setting information, T3_3S6M as a thirty-sixth pulse width setting information, T3_4S3M as a thirty-seventh pulse width setting information, T3_4S4M as a thirty-eighth pulse width setting information, T3_4S5M as a thirty-ninth pulse width setting information, T3_4S6M as a fortieth pulse width setting information, T3_5S3M as a forty-first pulse width setting information, T3_5S4M as a forty-second pulse width setting information, T3_5S5M as a forty-third pulse width setting information, T3_5S6M as a forty-fourth pulse width setting information, T3_6S3M as a forty-fifth pulse width setting information, T3_6S4M as a forty-sixth pulse width setting information, T3_6S5M as a forty-seventh pulse width setting information, and T3_6S6M as a forty-eighth pulse width setting information.

For the parameter T4, the following sixteen cases are considered concerning its setting values.

Namely, the cases of Lm=3T and Ls2=3T (denoted by T4_3S3M), Lm=4T and Ls2=3T (denoted by T4_3S4M), Lm=5T and Ls2=3T (denoted by T4_3S5M), Lm≧6T and Ls2=3T (denoted by T4_3S6M), Lm=3T and Ls2=4T (denoted by T4_4S3M), Lm=4T and Ls2=4T (denoted by T4_4S4M), Lm=5T and Ls2=4T (denoted by T4_4S5M), Lm≧6T and Ls2=4T (denoted by T4_4S6M), Lm=3T and Ls2=5T (denoted by T4_5S3M), Lm=4T and Ls2=5T (denoted by T4_5S4M), Lm=5T and Ls2=5T (denoted by T4_5S5M), Lm≧6T and Ls2=5T (denoted by T4_5S6M), Lm=3T and Ls2≧6T (denoted by T4_6S3M), Lm=4T and Ls2≧6T (denoted by T4_6S4M), Lm=5T and Ls2≧6T (denoted by T4_6S5M), and Lm≧6T and Ls2≧6T (denoted by T4_6S6M), as summarized in FIG. 6D.

Alternatively, these cases are also expressed for convenience, as follows. That is, the term T4_3S3M is expressed as a forty-ninth pulse width setting information, T4_3S4M as a fiftieth pulse width setting information, T4_3S5M as a fifty-first pulse width setting information, T4_3S6M as a fifty-second pulse width setting information, T4_4S3M as a fifty-third pulse width setting information, T4_4S4M as a fifty-fourth pulse width setting information, T4_4S5M as a fifty-fifth pulse width setting information, T4_4S6M as a fifty-sixth pulse width setting information, T4_5S3M as a fifty-seventh pulse width setting information, T4_5S4M as a fifty-eighth pulse width setting information, T4_5S5M as a fifty-ninth pulse width setting information, T4_5S6M as a sixtieth pulse width setting information, T4_6S3M as a sixty-first pulse width setting information, T4_6S4M as a sixty-second pulse width setting information, T4_6S5M as a sixty-third pulse width setting information, and T4_6S6M as a sixty-fourth pulse width setting information.

Therefore, sixty-four (16×4) kinds of pulse width setting information are required in the present embodiment during data recording, and the pulse width setting register 242 is provided with 64 storage regions, that is, the number of pulse width setting items amount to 64.

The sequencer 244 is therefore adapted to detect both the length of the mark to be recorded based on recording signals and the lengths of the space immediately before and after the mark, extract a suitable pulse width setting value from the pulse width setting register 242 based on the results obtained from the detection, and generate emission timing signals S6.

On the other hand, the aforementioned driving current setting information consists of a first driving current value (Ib) corresponding to the bottom power Pb, a second driving current value (Ifr) corresponding to the front boot power Pbst1, a third driving current value (Imid) corresponding to the middle power Pw, and a fourth driving current value (Irear) corresponding to the end boot power Pbst2.

Therefore, four kinds of driving current setting information are required in the present embodiment during data recording, and the driving current setting register 243 is provided with 4 storage regions, that is, the number of driving current setting items amounts to 4.

It may be added that a further driving current value (Ir) corresponding to the reproducing power Pr is stored during reproducing data in the region for storing the driving current value Ib. In addition, the values stored in the above noted storage regions are all in the form of digital.

As a result, the number of the setting items related to the pulse shape amount to 68 in total.

Alternatively, in the present embodiment these driving current values Ib, Ifr, Imid, and Irear are also expressed for convenience as first, second, third, and fourth driving current setting information, respectively.

It should be noted that suitable values of both the pulse width setting information and the driving current setting information change with linear recording speeds as illustrated in FIG. 7.

For example, it is assumed in the present embodiment that several pieces of information are additionally stored in the storage regions of flash memory 39 as a part of the aforementioned recording conditions, including pulse width setting information (T1_3S3M through T4_6S6M), middle power Pw, Ifr/Imid (i.e., Rfr), and Irear/Imid (i.e., Rrear), each prepared to be appropriate for four kinds of linear recording speeds (6X, 8X, 12X, and 16X) and for every kind of optical disc.

In addition, the bottom powers Pb are assumed to remain constant independently of the linear recording speeds and stored in the storage regions of flash memory 39 as a part of the aforementioned recording conditions for the every kind of optical disc.

The abovementioned conditions such as the pulse width setting information, middle power Pw, Rfr, and Rrear, are hereinafter referred to as a general term, "recording characteristics information".

Moreover, although both the periods of the channel clock at respective linear speeds and the middle power Pw illustrated in FIG. 7 are assumed to be constant for convenience, it may be noted in practice that the period of the channel clock decreases and the middle power Pw increases with increasing linear speed.

Referring again to FIG. 3, the APC circuit 248 is adapted to correct the driving current setting information sent to multiplexer 246 from driving current setting register 243 based on the monitor signals S7.

The multiplexer 246 is configured during data recording to properly make a selection, based on emission timing signals S6, among the values, Ib, Ifr, Imid, and Irear, which are sent by way of APC circuit 248, and to output to DAC 247.

As illustrated in FIG. 8, for example, it is assumed that the emission timing signals S6 consists of two signals, S6a and S6b, and that multiplexer 246 is configured to select Ib for S6a=0 (Low or L) and S6b=0 (L), Imid for S6a=1 (High or H) and S6b=0 (L), Ifr for S6a=0 (L) and S6b=1 (H), and Irear for S6a=1 (H) and S6b=1 (H).

Under the abovementioned assumption on the emission timing signals and driving current setting information, the sequencer 244 is configured to perform several operations as illustrated in FIG. 9, such as switching S6b to 1 (H) at the time T1 after the reference point, and S6a to 1 (H) and S6b to 0 (L) at T2. In addition, the sequencer 244 switches S6b to 1 (H) at T3, and S6a to 0 (L) and S6b to 1 (H) at T4.

Incidentally, the multiplexer 246 during reproduction period continuously outputs the drive current Ir with the value corresponding to the reproducing power Pr.

The DAC 247 performs the D/A conversion of output signals from the multiplexer 246. Resultant signals output from of DAC 247 are sent to the optical pickup unit 23 as driving currents (driving signals).

With the configuration described herein above, the optical disc apparatus 20 is adapted, upon its power switched-on to perform predetermined steps of initialization process and await a setting of an optical disc. It is assumed in the present embodiment that a timer interrupt of 10 ms is set and authorized during the initialization process. Then, it is feasible to determine during the 10 ms time interrupt process whether a disc is set in the apparatus.

Figure 10:
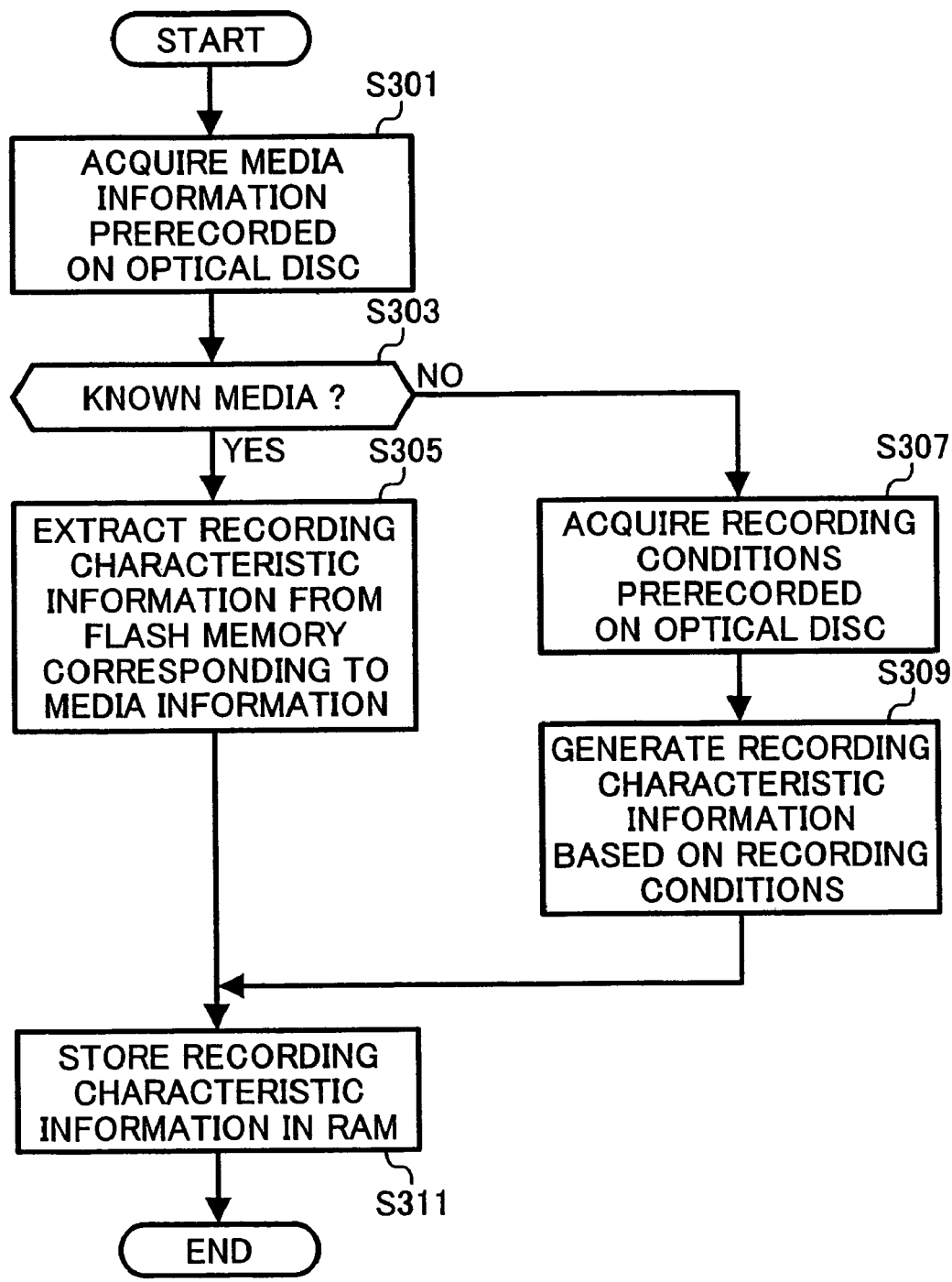
FIG. 10 includes a flowchart illustrating process steps for acquiring recording characteristics information.

After setting of the optical disc 15, the optical disc apparatus 20 is configured to set a leading address of the program corresponding to the flowchart illustrated in FIG. 10 (which is hereinafter referred to as "recording characteristics information acquisition program") in a program counter of CPU 40, and to initiate a process for acquiring recording characteristics information (which is hereinafter abbreviated as "recording characteristics information acquisition process"). The flowchart of FIG. 10 corresponds to a series of process algorithm executed by the CPU 40.

Incidentally, it is assumed that a driving current value Ir corresponding to reproducing power Pr is stored previously in the driving current setting register 243.

The process begins in step 301, where media information (e.g., related to vendor and media type) is readout from the optical disc 15, which is previously recorded in read-in regions of the disc 15 as a portion of prerecorded information.

After step 301, the process proceeds to step 303, where an inquiry is made regarding whether the optical disc 15 is a known medium in reference to the recording conditions stored in data regions of flash memory 39.

If recording characteristics information corresponding to the optical disc 15 is detected in the data regions of flash memory 39, the response to the inquiry in step 301 is affirmative (indicating that the optical disc 15 is a known medium), and the process proceeds to step 305.

In step 305, the recording characteristics information corresponding to the optical disc 15 is retrieved from the data regions of flash memory 39 and the process proceeds to step 311.

In step 311, the recording characteristics information corresponding to the optical disc 15 is stored in RAM 41 and the setting information acquisition process ends.

By contrast, if no recording characteristics information corresponding to the optical disc 15 is detected in the data regions of flash memory 39, the response to the inquiry in step 303 is negative (indicating that the optical disc 15 is not a known medium), and the process proceeds to step 307.

In step 307, recoding conditions previously recorded in read-in regions of the disc 15 are acquired. The recoding conditions include pulse width setting information for respective linear recording speeds, set powers during performing OPC (optimum power control), target values of pertinent parameters for determining the optimum recording power, and other similar values. Upon completing step 307, the process proceeds to step 309.

In step 309, recording characteristics information for the optical disc 15 is generated based on thus acquired recoding conditions.

Incidentally, if any discrepancy in recoding conditions is evident between the acquired and the optimum ones, another set of recording characteristics information may alternatively be formed after suitable corrections such as, for example, multiplying the recoding conditions by a predetermined factor. Thereafter, the process proceeds to the step 311.

<<Recording Process>>

In the next place, a process executed by the optical disc apparatus 20 upon receiving a record (record request) command from a host apparatus 90 will be described in reference to FIG. 11. This process by the disc apparatus 20 is carried out to record user data on an optical disc, according to the CAV mode, in the region having the address specified by the recording command, and hereinafter referred to as recording process.

Figure 11A:
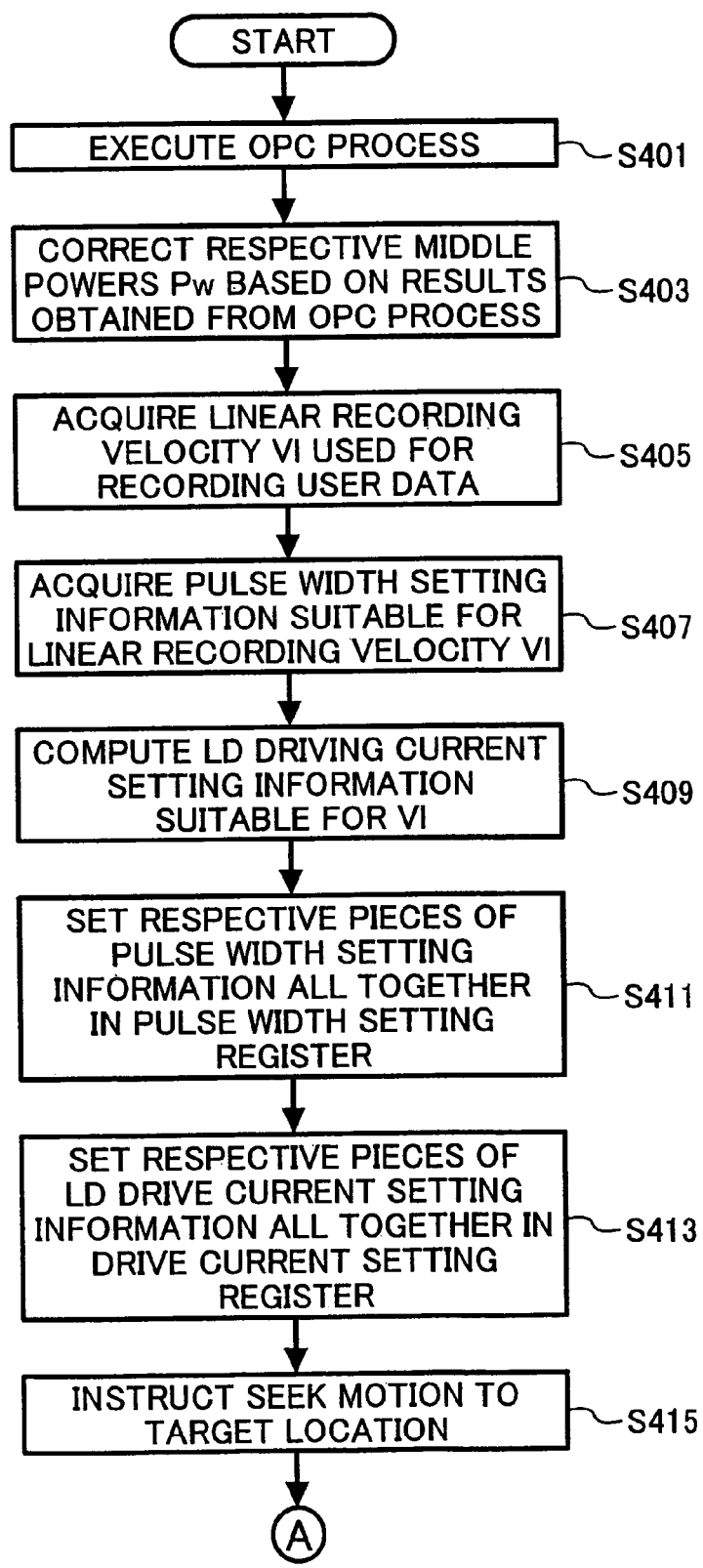
FIG. 11 includes a flowchart illustrating a recording process implemented by the optical disc apparatus of the invention upon receiving a record command so as to record user data supplied by a host apparatus.
Figure 11B:
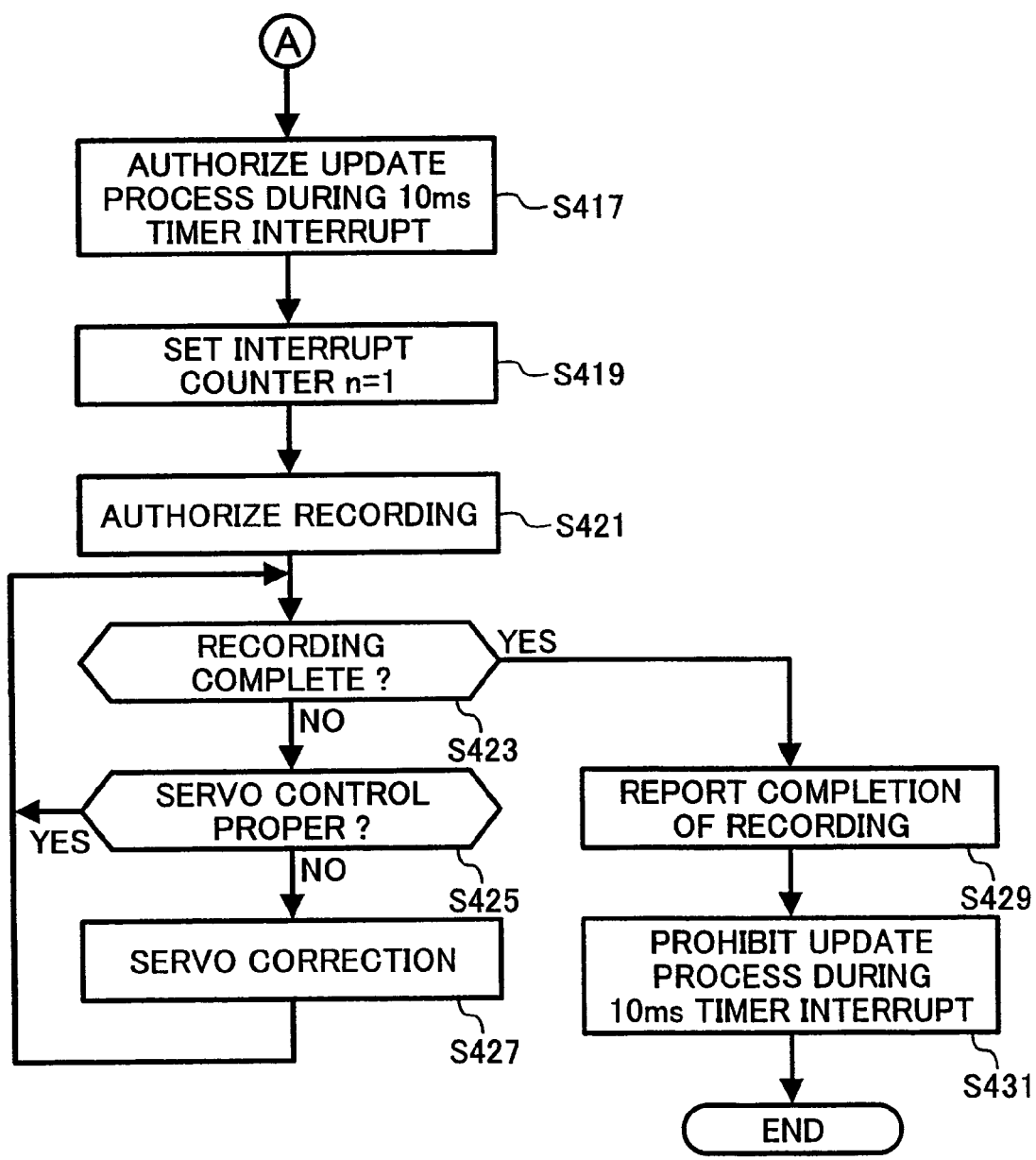
Figure 12:
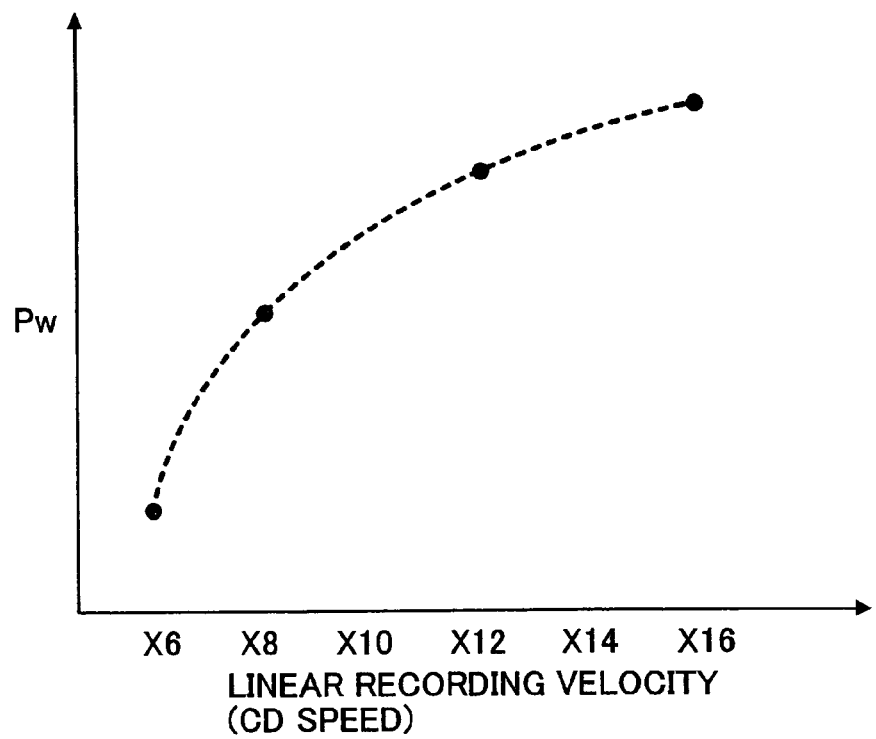
FIG. 12 includes a graphical plot of middle power as a function of linear recording speed according to one embodiment of the invention.

FIG. 11 includes, therefore, a flowchart illustrating recording process steps executed by CPU 40 corresponding to a series of process algorithm.

Upon receiving a record command from a host apparatus 90, the CPU 40 instructs to set the leading address of the program in a program counter of the CPU 40, in which the program is stored in the program regions in the flash memory 39 and corresponds to the flowchart included in FIG. 11, and hereinafter referred to as "record process program." And, a record process begins.

Incidentally, it is assumed that the aforementioned setting information acquisition process is already implemented and the recording characteristics information corresponding to the optical disc 15 is stored in RAM 41. In addition, it is also assumed that the optical disc 15 rotates at a constant angular velocity during data recording.

In the first step 401, the OPC process is implemented. Namely, an optimum recording power is determined in the present OPC process by (a) adding by writing (recording) predetermined data into an adding area (which is called CPA, or power calibration area) provided on the optical disc 15 with a recording power changing step by step while rotating at a predetermined linear recording speed (V0), (b) playing back these predetermined data successively, (c) determining the case, in which an asymmetry value of one of the data detected from its RF signal is approximately in coincidence with the target value obtained previously from experimentation, (d) regarding the value corresponding to the case as the highest recording quality, and (e) determining the recording power corresponding to the above power as the optimum recording power at the linear recording speed V0.

In the next step 403, middle powers Pw are corrected for respective linear recording speeds based on the results obtained from the OPC process (FIG. 12), and the process proceeds to step 405.

In step 405, a linear recording speed (V1) is acquired for recording user data in the address designated by a recording command (or, designated address). This speed V1 is computed from both the rotation speed of the optical disc 15 and the distance from the disc center to the designated address.

In the next step 407, pulse width setting information at the linear recording speed V1 is acquired based on the recording characteristics information stored in RAM 41.

The computation is carried out (a) for the linear recording speed V1 of six-speed (6X), eight (8X), twelve (12X), or sixteen (16X), by retrieving corresponding pulse width setting information from the recording characteristics information, or (b) for a linear recording speed V1 other than 6X, 8X, 12X, or 16X, by carrying out an approximate, or an interpolation calculation based on the values corresponding to two neighboring recording speeds, which are identified to interpose the present recording speed between the two so that the proper value of pulse width setting information is computed.

For example, a linear recording speed V1 of interest is identified between 6X and 8X, the pulse width setting information is computed using the relation (1).

Pulse width setting information at $V1$=pulse width setting information at 6X ×(1−linear speed ratio)+pulse width setting information at 8X×linear speed ratio (1).

Incidentally, the above mentioned parameter, linear speed ratio, in the relation (1) is given by (V1−6)/2. Specifically, in the case when 100 is assumed for T1 at 6X and 90 for T1 at 8X, the T1 value at 7X is obtained as 100×(1−0.5)+90×0.5=95.

In step 409, the bottom power Pb, middle power Pw at the linear recording speed V1, Rfr, and Rrear are acquired based on the recording characteristics information stored in RAM 41.

In similar manner to the earlier computation of pulse width setting information, the computation of Pw, Rfr, or Rrear is carried out (a) for the linear recording speed V1 of 6X, 8X, X12, or X16, by retrieving the corresponding value of Pw, Rfr, or Rrear, or (b) for a linear recording speed V1 other than 6X, 8X, X12, or X16, by carrying out an approximate, or an interpolation calculation based on the values corresponding to two neighboring recording speeds, which are identified to interpose the present recording speed between the two, so that proper values of Pw, Rfr, or Rrear is computed.

Subsequently, a first driving current value Ib corresponding to the bottom power Pb and a second driving current value Imid corresponding to the middle power Pw are respectively computed based on I vs. L characteristics of the laser source.

Moreover, a third driving current value Ifr corresponding to the front boot power Pbst1 is computed using the following relation (2) and a fourth driving current value Irear corresponding to the end boot power Pbst2 is also computed using the relation (3).

$$Ifr = Imid \times Rfr \quad (2).$$

$$Irear = Imid \times Rrear \quad (3).$$

In the next step 411, pulse width setting information (T1_3S3M through T4_6S6M) at the linear recording speed V1 is set all together in the pulse width setting register 242.

In step 413, the driving current values Ib and the further driving current value Imid at the linear recording speed V1, Ifr, and Irear are set all together in the driving current setting register 243.

In the next step 415, the drive control circuit 26 is instructed so that a light spot is formed in the vicinity of a target location corresponding to the aforementioned designated address. According to the instruction a seek motion is implemented. If no seek motion is necessary, this step is excluded.

In step 417, an update process to be detailed later is authorized during a timer interrupt of 10 ms.

In step 419, an interrupt counter for counting an interrupt number, n, is initialized by setting one (1).

In step 421, one process of recording is authorized. Accordingly, a recording process in an optical disc is initiated by means of the encoder 25, laser control circuit 24, and optical pickup unit 23.

In step 423, an inquiry is made regarding whether the recording process is completed. If the response to the inquiry in step 423 is negative indicating that the process is incomplete, the process proceeds to step 425.

In the next step 425, another inquiry is made regarding whether the servo control is functioning properly in reference to the address information from the playback signal processing circuit 28.

If the response to the inquiry in step 425 is affirmative indicating that the control is functioning properly, the process returns to the step 423. However, if the response to the inquiry in step 425 is negative indicating that the control is not working properly, the process proceeds to step 427.

In step 427, a servo correction is made such that the servo control functions properly, and the process returns to the step 423.

In step 423, another inquiry is made regarding whether the recording process is complete. If the response to the inquiry in step 423 is affirmative indicating that the process is complete, the process proceeds to step 429.

In step 429, the completion of the recording is reported to the host apparatus 90.

In the next step 431, the update process during the timer interrupt of 10 ms is prohibited, and then the recording process ends.

The aforementioned update process will be described herein below referring to the flowchart included in FIG. 13.

Figure 13:
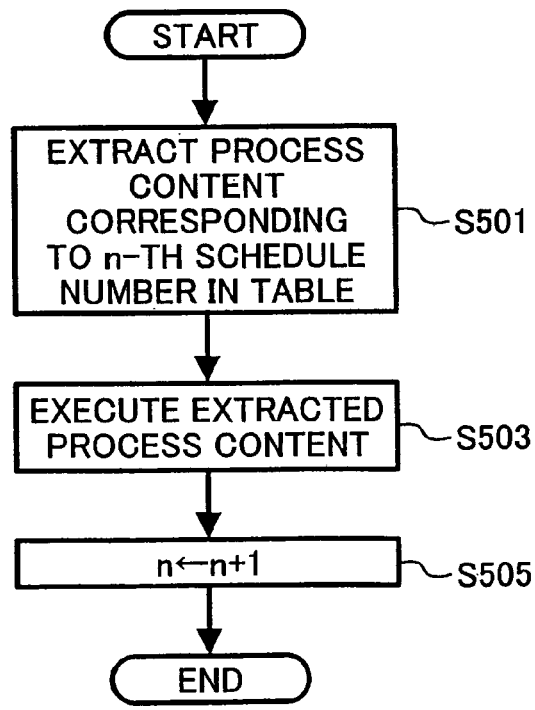
FIG. 13 includes a flowchart illustrating an update process authorized during a timer interrupt.

When an update process is authorized during the timer interrupt of 10 ms, the program is booted, which corresponds to the flowchart included in FIG. 13 and stored in the program regions in the flash memory 39, and the update process begins. This program is hereinafter referred to as "update process program".

Namely, over the period in which the update process is authorized, the update process program is booted in every 10 ms (milliseconds) and update processes are repeated.

For example, it is assumed in the present embodiment that sixty-four pieces of pulse width setting information (T1_3S3M through T4_6S6M) and three values of driving current setting information (Ifr, Imid, and Irear) are to be updated, and that the process contents, which are referred to, and implemented during the update process, are contained in the aforementioned schedule table corresponding to schedule numbers, first through seventy-first, as shown in FIG. 14.

Figure 15:
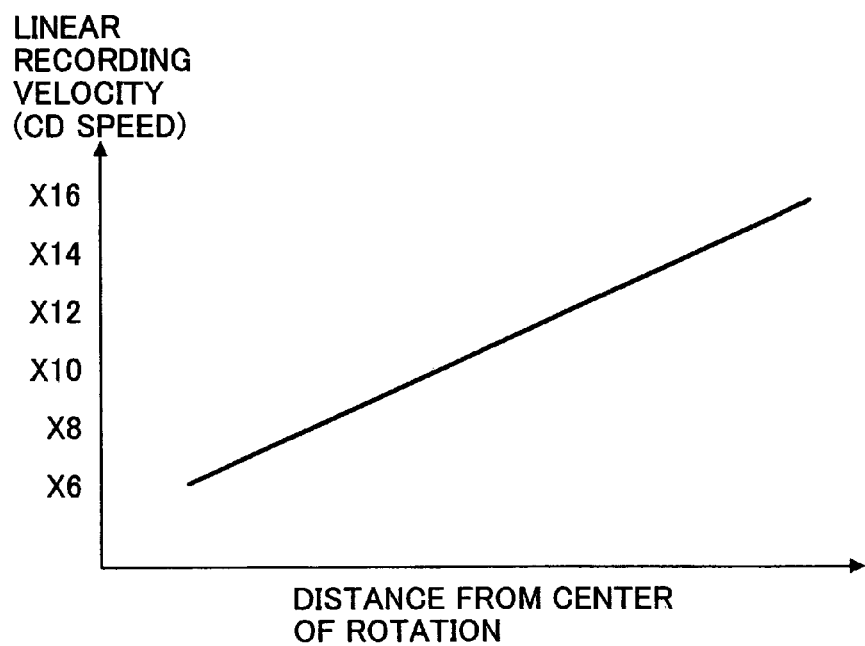
FIG. 15 includes a graphical plot illustrating the change in linear recording velocity in the CAV mode as a function of the distance from the center of disc.

Since the optical disc rotates at a constant angular velocity in the CAV mode, the linear recording velocity (in the unit of CD velocity) changes continuously while rotating, as illustrated in FIG. 15, depending on the distance from the center of disc and the designated linear recording velocity for the disc.

Therefore, both the pulse width setting information and the driving current setting information preferably change as smoothly as possible with linear recording velocity.

Figure 16:
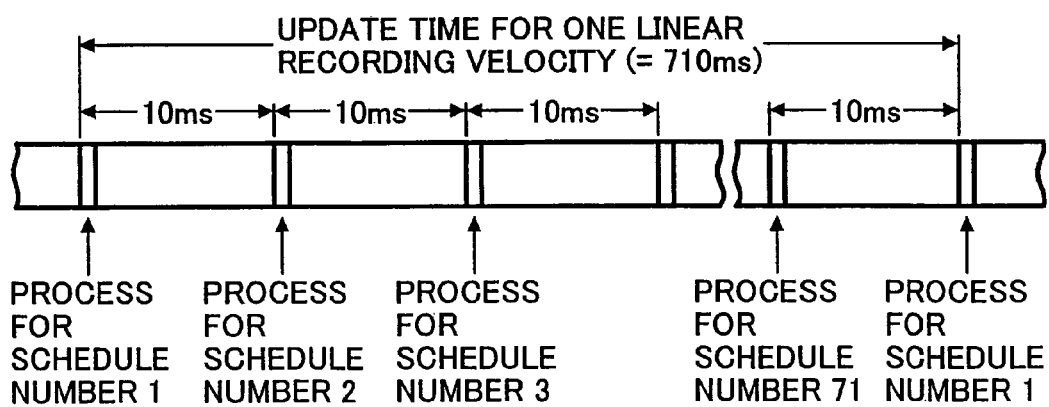
FIG. 16 illustrates a configuration for updating each value of setting information according to one embodiment of the invention.

It is generally known that the time of approximately 30 seconds is required to increase the linear recording velocity from the 6X speed to 8X for an optical disc. Accordingly, in order for all update steps of setting information be completed within approximately one second, it is configured in the present embodiment for each setting step to be carried out within 10 ms (FIG. 16). Namely, the setting information in respective registers are updated to the values suitable for the present linear recording velocity in every fractional change, (1/15)X, in the linear recoding velocity.

In the first step 501, a schedule number is specified to be the same as the present number "n" detected in the aforementioned interrupt counter, thereafter the process content in the schedule table corresponding to thus specified schedule number is extracted.

In the next step 503, the process contents retrieved as above are now executed.

Namely, for the schedule number n=1, acquire pulse width setting information, first through thirty-second, corresponding to the present linear velocity in the manner described above;

for n=2, acquire pulse width setting information, thirty-third through sixty-fourth, corresponding to the present linear velocity;

for n=3, compute driving current values Ifr, Imid, and Irear suitable for the present linear velocity;

for n=4, set thus computed Ifr value in driving current setting register 243;

for n=5, set the Imid value in driving current setting register 243;

for n=6, set the Irear value in driving current setting register 243;

for n=7, set the first pulse width setting information T1_3S3M in pulse width setting register 242;

for n=8, set the second pulse width setting information T1_3S4M in pulse width setting register 242;

. . .

. . .

for n=69, set the sixty-third pulse width setting information T4_6S5M in pulse width setting register 242;

for n=70, set the sixty-fourth pulse width setting information T4_6S6M in pulse width setting register 242; and for n=71, set n=0.

Thus, both the driving current setting information in the driving current setting register 243 and the pulse width setting information in the pulse width setting register 242 are updated successively while continuing recording operation.

In the next step 505, one (1) is added to the interrupt number n in the interrupt counter, and the update process ends.

As a result of the abovementioned minute period of time for each update, the monitoring can be performed at a required timing regarding whether the servo control is functioning properly.

It is apparent from the above description, the control means is implemented in the optical disc apparatus 20 in the present embodiment by the CPU 40 and the programs executed therewith.

It is added that the abovementioned control means with the programs may be implemented either partially or entirely with hardware.

In addition, the programs related to the update process are executed in the present embodiment among those stored in the flash memory 39 as storage medium, and the process steps for acquiring and updating according to the present embodiment are carried out as illustrated by the flowchart of FIG. 13.

As described herein above, upon receiving a record (record request) command from a host apparatus 90, the optical disc apparatus 20 according to the present embodiment is configured to (a) acquire (i) plural pieces of pulse width setting information (T1_3S3M through T4_6S6M) suitable for linear recording velocity V1 in recording user data in the region having the address specified by the recording command, (ii) the driving current value Ib, and (iii) driving current values, Imid, Ifr, and Irear, suitable for the linear recording velocity V1, (b) set the plural pieces of pulse width setting information in the pulse width setting register 242 by the serial transmission, (c) set the driving current values, Imid, Ifr, and Irear, in the driving current setting register 243, and (d) initiate a recording operation.

Thereafter, an update process by the aforementioned 10 ms timer interrupt is carried out while continuing the recording operation.

Namely, (a) in the process steps, first through third, corresponding to schedule number n=1 through 3, the pulse width setting information, and driving current values, Imid, Ifr, and Irear, suitable for the present linear recording velocity V1 are acquired, (b) in the fourth through sixth steps, the values Imid, Ifr, and Irear are set respectively in the driving current setting register 243, and (c) in the seventh through seventeenth steps, the pieces of pulse width setting information (T1_3S3M through T4_6S6M) are set in the pulse width setting register 242 by the serial transmission.

Therefore, the setting information stored in respective registers is updated to the suitable one by seventy steps of updating.

As a result, it becomes feasible for the CPU to monitor various portions of the apparatus in proper timing to detect and then prevent, if necessary, any undue status such as, for example, failure in servo control of the apparatus during recording, for example. And, the recording process can be carried out at higher speeds with excellent image qualities without causing the increase in size and costs of the apparatus.

While the pulse width setting information is set in the abovementioned example from the first piece to sixty-fourth successively in the pulse width setting register 242, the information may alternatively be set such that the pieces, which are simultaneously referred to, can be set continuously, in which these pieces are related, for example, to the same length of either the recording mark, or the space immediately before or after the recording mark, respectively.

Namely, as illustrated in the schedule table of FIG. 17, (a) for n=7, set the first pulse width setting information T1_3S3M, and for n=8, set the seventeenth pulse width setting information T2_3S3M, whereby the pieces of the pulse width setting information for Lm=3T and Ls1=3T is set continuously, (b) for n=9, set the thirty-third pulse width setting information T3_3S3M, and for n=10, set the forty-ninth pulse width setting information T4_3S3M, whereby the pieces of the pulse width setting information for Lm=3T and Ls2=3T is set,

. . .

. . .

(c) for n=67, set the sixteenth pulse width setting information T1_6S6M, and for n=68, set the thirty-second pulse width setting information T2_6S6M, whereby the pieces of the pulse width setting information for Lm≧6T and Ls1≧6T is set, and (d) for n=69, set the forty-eighth pulse width setting information T3_6S6M, and for n=70, set the sixty-fourth pulse width setting information T4_6S6M, whereby the pieces of the pulse width setting information for Lm≧6T and Ls2≧6T is set continuously.

In addition, among the abovementioned pieces of the pulse width setting information having the same length of the space immediately before and after the recording mark, those referred to with a higher frequency during recording operation may alternatively be set in the pulse width setting register 242 taking precedence over other pieces of the pulse width setting information.

In the above noted update process, there illustrated was the case of all of sixty-four pieces of the pulse width setting information in the pulse width setting register 242 was updated. However, the process is not limited only to updating the sixty-four pieces all together, but may also be carried out alternatively by suitably excluding some of the pieces from updating in such a case as illustrated herein below.

Figure 18:
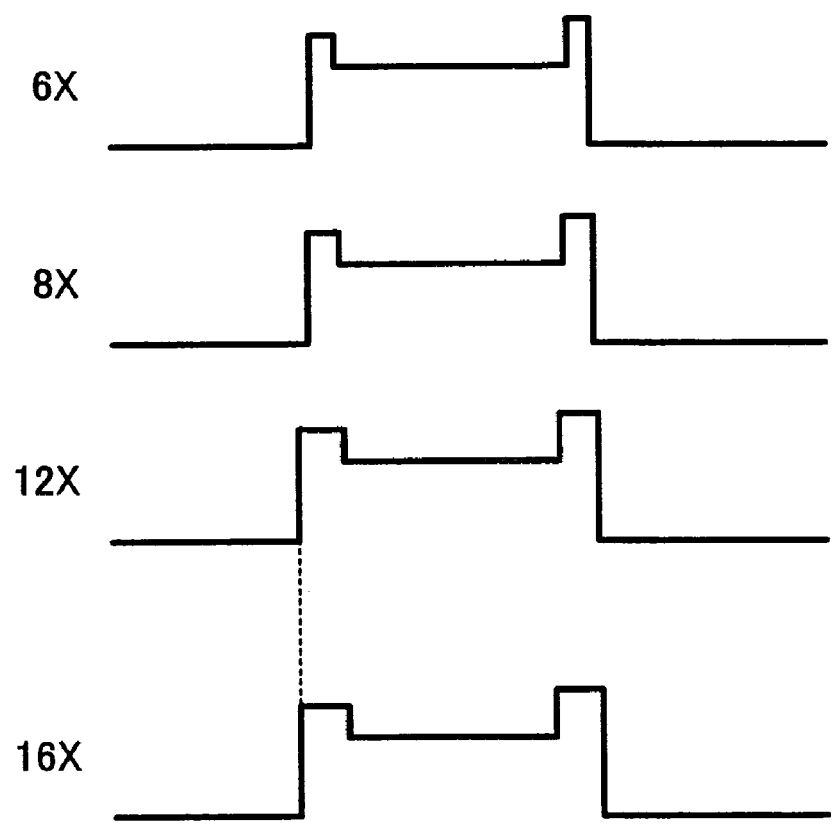
FIG. 18 includes drawings illustrating the change in suitable values of both pulse width setting information and driving current setting information for different linear recording speeds, in which the period of time T1 is the same for the recording speeds 12X and 16X.

Referring to FIG. 18, for example, in the case when the period of time T1 is the same for the recording speeds 12X and 16X, and the linear recording velocity remains in the range between the above speeds, some pieces of the pulse width setting information, the first T1_3S3M through sixteenth T1_6S6M, can be excluded from updating, and the schedule table is revised in this case as shown in FIG. 19.

Namely, for the schedule number n=7, set the seventieth pulse width setting information T2_3S3M in pulse width setting register 242;
for n=8, set the eightieth pulse width setting information T2_3S4M;
. . .
. . .
for n=53, set the sixty-third pulse width setting information T4_6S5M;
for n=54, set the sixty-fourth pulse width setting information T4_6S6M; and
for n=55, set n=0.

Therefore, the number of updating process steps decreases for one single linear recording speed.

Although both the periods of the channel clock at respective linear speeds and the middle power Pw illustrated in FIG. 18 are assumed to be constant for convenience, it may be noted in practice that the period of the channel clock decreases and the middle power increases with increasing linear speed. In addition, the update process in the present case may alternatively be implemented with the period of the timer interrupt to be 20 ms in place of 10 ms mentioned earlier.

Figures 20, 21:
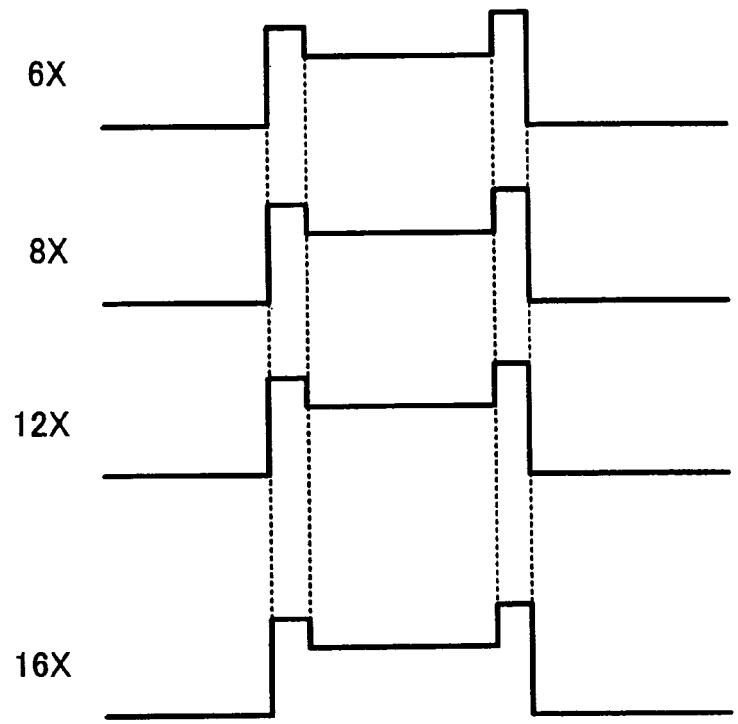
FIG. 20 includes drawings illustrating the change in suitable values of both pulse width setting information and driving current setting information for different linear recording speeds, in which pulse width setting information, which is set in advance before initiating the recording, can be used as it is for respective recording velocities because of a relatively large margin of pulse width for recording quality.
FIG. 21 includes still another schedule table containing the process contents implemented during update process corresponding to the change in various pieces of information for different linear recording speeds shown in FIG. 20, in which only driving current values, Imid, Ifr, and Irear, are updated during the process.

In addition, in the case where the margin of pulse width for recording quality is relatively large, the update process may alternatively be carried out by using pulse width setting information as it is, which is set in advance before initiating the recording, for respective recording velocities (FIG. 20).

In this instance, only driving current values, Imid, Ifr, and Irear, are updated during the update process, and the process is carried out according to the schedule table shown in FIG. 21.

Namely, for n=1, compute as described earlier the driving current values Ifr, Imid, and Irear suitable for the present linear velocity;
for n=2, set thus computed Ifr value in driving current setting register 243;
for n=3, set the Imid value;
for n=4, set the Irear value; and
for n=5, set n=0.

Therefore, the number of updating process steps decreases further for one single linear recording speed.

Although both the periods of the channel clock at respective linear speeds and the middle power Pw illustrated in FIG. 18 are assumed to be constant for convenience, it may be noted in practice that the period of the channel clock decreases and the middle power increases with increasing linear speed. In addition, the update process in the present case may alternatively be implemented with the period of the timer interrupt as 20 ms in place of 10 ms mentioned earlier.

In the update process described above, the pieces of setting information are updated regardless of the difference in the pieces between before and after the update process.

However, the process is not limited only to those process steps, but may also be carried out alternatively by suitably taking the difference into consideration. And, in the case when the difference in the pieces of setting information exceeds a predetermined upper limit between before and after the update process, the update process may be carried out several times such that the difference caused in each time is smaller than a predetermined upper limit.

For example, when the difference in the time period T1 between before and after the update process exceeds an upper limit, the schedule table for the process steps is formed as shown in FIG. 22.

Referring to FIG. 22,
(a) for the schedule numbers n=7 through 22, set the first time (or, as a first attempt) the pulse width setting information for T1, including the steps of,
for n=7, setting the first pulse width setting information T1_3S3M;
for n=8, setting the second pulse width setting information T1_3S4M;
. . .
. . .
for n=15, setting the fifteenth pulse width setting information T1_6S5M; and
for n=16, setting the sixteenth pulse width setting information T1_6S6M,
(b) for the schedule numbers n=23 through 54, set pulse width setting information for T3, including the steps of,
for n=23, setting the seventeenth pulse width setting information T3_3S3M;
for n=24, setting the eighteenth pulse width setting information T3_3S4M;
. . .
. . .
for n=53, setting the forty-seventh pulse width setting information T3_6S5M; and
for n=54, setting the forty-eighth pulse width setting information T3_6S6M, and
(c) for the schedule numbers n=55 through 72, set the second time (or, as a second attempt) the pulse width setting information for T1, including the steps of,
for n=55, setting the first pulse width setting information T1_3S3M;
for n=56, setting the second pulse width setting information T1_3S4M;
. . .
. . .
for n=71, setting the fifteenth pulse width setting information T1_6S5M; and
for n=72, setting the sixteenth pulse width setting information T1_6S6M.

The setting for T4 is subsequently carried out for the schedule numbers n=73 through 66, including the steps of,
for n=73, setting the forty-ninth pulse width setting information T4_3S3M;
for n=74, setting the fifteenth pulse width setting information T4_3S4M;
. . .
. . .
for n=85, setting the sixty-third pulse width setting information T4_6S5M; and
for n=86, setting the sixty-fourth pulse width setting information T4_6S6M.

Thereafter, the setting n=0 is made at the schedule number n=87.

As a result, the pulse width setting information and the driving current setting information can be updated smoothly over the setting process.

It may be added that the abovementioned update process implemented several times is preferably carried out not consecutively but separated with one another. This is exemplified by the above noted process steps according to the schedule table of FIG. 22, in which the second time T1 setting steps are implemented not to be consecutive to, but separated from the second time steps.

In the abovementioned update process according to the embodiment of the invention, a heating pulse for forming a recording mark is assumed as formed of three component pulses (i.e., front boot pulse, middle pulse, and end pulse).

However, the process is not limited only to those process steps, but may also be carried out alternatively using four or more component pulses depending on the kind of media. In addition, in order to reduce heat storage in the optical disc, another cooling pulse may be provided following the end boot pulse.

It may be added that the abovementioned additional items of the process may increase concomitant storage regions in the register, and the schedule number in the schedule table also increases as much, accordingly.

Also in the abovementioned update process, it is configured for all update steps of setting information be completed approximately within one second. However, the process is not limited only to those steps.

Alternatively, the update steps may not be completed within one second, for example, in the case when the change in suitable setting information is relatively small with linear recording velocity, or when the speed of rotation for the optical disc is relatively low.

Also, the frequency of booting the update process may change depending on the processing capability by the CPU, in that the frequency can increase when the CPU capability is high enough, while it can decrease when the capability is low. Namely, the frequency of booting may change depending on the number of setting items to be updated, the speed of rotation of optical disc, the processing capability of the CPU, the magnitude of change in setting information, and the contents of operation control during recording.

In addition, although the data recording on optical disc is assumed to be carried out in the CAV mode in the embodiment described above, the method for recording is not limited only to that mode, but may also be carried out alternatively according to other methods such as, for example, zone CLV (Z-CVD) mode or partial CVD (P-CVD). That is, the techniques described above can be adopted in a recording mode in which the linear recording velocity changes during recording.

Still in addition, although the programs for implementing data recording on optical disc is assumed as stored in the flash memory 39 in the embodiment described above, the method of program storage is not limited only to that method, but may also be stored alternatively in other recording media such as, for example, CD, magneto-optical disc, DVD, memory card, hard disc, USB memory, flexible disc, and other similar media.

In such a case the programs according to the invention is made effective by loading to the flash memory 39 by way of playback apparatus adaptable to the media (or by exclusive interface). Alternatively, these programs may be used after transferring by way of a network (e.g., LAN, intranet, or the Internet). That is, the programs may be available for the recording as long as they are stored in the flash memory 39.

Although the optical disc 15 is described above as in conformity to the DVD+R standards, the disc in the embodiment is not limited only to that type, but another type of disc such as, for example, a next-generation recording medium may also be used, which is adaptable to light beams at the wavelength of approximately 405 nm. That is, the discs may be effective in data recording as long as they are of the type utilizing light beams for the recording.

In addition, although the optical disc 15 is described above as formed of one recording layer, the disc in the embodiment is not limited only to the single-layered disc but formed of multiple recording layers. Also in this case these recording layers may be a mixed structure of one layer conforming to the CD standards and the other the DVD standards.

Moreover, the optical pickup unit in the present embodiment is described earlier as the light source with one single semiconductor laser device. However, the light source is not limited only to the single laser device but may alternatively be provided with plural laser devices each emanating light beams different in wavelength with each other.

In such a case, the light source may be formed including at least a first semiconductor laser device emitting light beams at a wavelength of 405 nm, a second device of 660 nm, and a third device of 780 nm, for example. That is to say, the optical disc apparatus in the invention may be formed to be adaptable to plural kinds of optical discs each conforming to the different standards.

Furthermore, although the optical disc apparatus in the present embodiment is described herein above as the information recording apparatus, a DVD recorder may alternatively be used in place of the optical disc apparatus. That is, the methods and the construction of in the optical disc apparatuses in the invention may also be adaptable to any form of information recording utilizing light beams.

It is apparent from the above description including the examples disclosed, that the method and apparatus disclosed herein offer several advantages over similar methods and apparatuses previously known, such as, for example, improved capabilities of suitably updating numerous setting items addressing the change in recording velocity of the optical disc caused during information recording.

This is done in the disclosed examples, by providing the present method for recording information on the surface of an optical recording disc by a pulsating laser beam emanated from a light source incorporated into an information recording apparatus, comprising the steps of, in case when a recording velocity changes during an operation of recording information, selecting setting items out of a plurality of items, in which the setting items are affecting to degrade recording quality with the change in the recording velocity and the plurality of items are used for determining the shape of pulsating laser beam; identifying a set of the item to be updated including the setting items; and updating the set item by item to values suitable for the present recording velocity at a predetermined time interval while continuing the operation of recording information.

In addition, when the recording velocity changes prior to the step of updating during the operation of recording information, the control unit is also configured to acquire, for example, one by one the values suitable for the present recording velocity by identifying two neighboring recording velocities interposing the present recording velocity there between, and carrying out either an approximate or interpolation calculation based on the two neighboring recording velocities.

On the other hand, an information recording apparatus is provided to record information through the abovementioned method steps.

In addition to the optical pickup unit, several registers, and signal generation circuit unit, the information recording apparatus comprises a control unit configured, in case when a recording velocity changes during the operation of recording information, to select setting items out of a plurality of items which affects to degrade recording quality; identify a set of items to be updated including the setting items; and update the set item by item to values suitable for the present recording velocity at a predetermined time interval while continuing the operation of recording information.

The control unit is also configured, in case when the recording velocity changes prior to the step of updating, to acquire one by one the values suitable for the present recording velocity a plurality of times not consecutively but separated with one another at the predetermined time interval, and, for example, by identifying two neighboring recording velocities interposing the present recording velocity there between, and carrying out either an approximate or interpolation calculation based on the two neighboring recording velocities.

By means of the information recording method and apparatus augmented by the computer program product, as disclosed above, the portions of the apparatus are suitably monitored in proper timing to detect and prevent, if necessary, any undue status such as, for example, failure in servo control of the apparatus during recording. As a result, the recording process becomes feasible at higher speeds with excellent recorded image qualities without causing the increase in size and costs of the apparatus.

While the invention has been described in connection with the preferred embodiment, it will be understood that it is not intended to limit the invention to the embodiment. On the contrary, it is intended to cover such modifications or variations as may come within the scope of the following claims.

What is claimed as new and desired to be protected by Letters Patent of the United States is:

1. A method of recording information on a surface of an optical recording disc by a pulsating laser beam emanated from a light source incorporated in an information recording apparatus, said method comprising the steps of:
    selecting at least one setting item out of a plurality of items during a recording operation where a recording velocity changes, said at least one setting item contributing to a degradation in recording quality due to the change in the recording velocity, and said plurality of items specifying a shape of said pulsating laser beam;
    identifying a set of at least one item of the plurality of items to be updated, said set including said at least one setting item; and
    updating each item of said set to values suitable for a present recording velocity at a predetermined time interval while continuing said recording operation.

2. The method according to claim 1, wherein said updating step further comprises successively updating a first group of said items in said set, said first group of items being referenced at a same time during said recording operation.

3. The method according to claim 2, wherein said updating step further comprises updating each item of a second group of said items in said set, said items in said second group taking precedence over other items of said set as a result of said items of said second group being referenced with a higher frequency than other items of said set during said recording operation.

4. The method according to claim 3, wherein said updating step is carried out by:
    identifying a third group of said items in said set, said items in said third group contributing to a first change, said first change exceeding a predetermined upper limit; and
    updating said third group of items a plurality of times such that a second change caused in each of the plurality of times does not exceed the predetermined upper limit.

5. The method according to claim 4, wherein the act of updating said third group of items a plurality of times comprises updating at least one other setting item in each of the plurality of times.

6. The method according to claim 5, wherein said set of items to be updated contains at least one of first plural items contributing to a driving current and second plural items contributing to a pulse width.

7. The method according to claim 6, wherein said optical recording disc is configured to rotate at a constant angular velocity.

8. The method according to claim 7, further comprising acquiring one by one said values suitable for the present recording velocity from said items to be updated while continuing said recording operation when the recording velocity changes prior to said updating of said set.

9. The method according to claim 8, wherein said step of acquiring one by one said values suitable for the present recording velocity is performed a plurality of times, each of the plurality of times being separated by said predetermined time interval.

10. The method according to claim 9, wherein, when said values suitable for the present recording velocity are previously acquired as a set of known recording velocities and when a recording velocity is presently different from each of said set of known recording velocities, said step of acquiring one by one said values suitable for the present recording velocity is performed by:
    identifying two neighboring known recording velocities interposing the present recording velocity there between; and
    carrying out one of an approximation calculation and an interpolation calculation based on said values suitable for said two neighboring known recording velocities.

11. The method according to claim 2, wherein said step of updating is carried out by:
    identifying a second group of said items in said set, said items in said second group contributing to a first change caused by said updating, said first change exceeding a predetermined upper limit; and
    updating said second group of items a plurality of times such that a second change caused in each of the plurality of times does not exceed the predetermined upper limit.

12. The method according to claim 2, wherein said set of items to be updated contains at least one of first plural items contributing to a driving current and second plural items contributing to a pulse width.

13. The method according to claim 2, wherein said optical recording disc is configured to rotate at a constant angular velocity.

14. The method according to claim 2, further comprising acquiring one by one said values suitable for the present recording velocity from said items to be updated while continuing said recording operation when the recording velocity changes prior to said updating of said set.

15. The method according to claim 3, wherein said set of items to be updated contains at least one of first plural items contributing to a driving current and second plural items contributing to a pulse width.

16. The method according to claim 3, wherein said optical recording disc is configured to rotate at a constant angular velocity.

17. The method according to claim 3, further comprising acquiring one by one said values suitable for the present recording velocity from said items to be updated while continuing said recording operation when the recording velocity changes prior to said updating of said set.

18. The method according to claim 6, further comprising acquiring one by one said values suitable for the present recording velocity from said items to be updated while continuing said recording operation when the recording velocity changes prior to said updating of said set.

19. The method according to claim 8, wherein, when said values suitable for the present recording velocity are previously acquired as a set of known recording velocities and when a recording velocity is presently different from each of said set of known recording velocities, said acquiring step is performed by:
    identifying two neighboring known recording velocities interposing the present recording velocity there between, and
    carrying out one of an approximation calculation and an interpolation calculation based on said values suitable for said two neighboring known recording velocities.

20. The method according to claim 1, wherein said updating step further comprises updating each item of a group of said items in said set, said items in said group taking precedence over other items of said set as a result of said items of said group being referenced with a higher frequency than other items of said set during said recording operation.

21. The method according to claim 1, wherein said updating step is carried out by:
    identifying a group of said items in said set, said items in said group contributing to a first change caused by said updating, said first change exceeding a predetermined upper limit; and
    updating said group of items a plurality of times such that a second change caused in each of the plurality of times does not exceed the predetermined upper limit.

22. The method according to claim 1, wherein said set of items to be updated contains at least one of first plural items contributing to a driving current and second plural items contributing to a pulse width.

23. The method according to claim 1, wherein said optical recording disc is configured to rotate at a constant angular velocity.

24. The method according to claim 1, further comprising, acquiring one by one said values suitable for the present recording velocity from said items to be updated while continuing said recording operation when the recording velocity changes prior to said updating of said set.

25. A computer readable storage medium containing a computer program product for use with an information recording apparatus configured to record information on a surface of an optical recording disc using a pulsating light beam emanated from a laser light source, said computer program product comprising:
    a computer usable medium having computer readable program code means embodied in said medium for causing information recording steps, said computer readable program code means comprising:
    at least one register means for storing a plurality of values of setting items for determining a pulse shape of the light beam;
    signal generation means for generating drive signals for the laser light source based on information stored in said at least one register means and recorded on the surface of said optical recording disc; and
    control means, when a recording velocity changes during a recording operation, for:
        selecting at least one setting item out of a plurality of items, said at least one setting item contributing to a degradation in recording quality;
        identifying a set of at least one item of the plurality of items to be updated, said set including said at least one setting item; and
        updating each item of said set to values suitable for a present recording velocity at a predetermined time interval while continuing said recording operation.

26. The computer readable storage medium with computer program product of claim 25, wherein said control means is configured for, when the recording velocity changes prior to said updating of said set, acquiring one by one said values suitable for the present recording velocity from said items to be updated while continuing said recording operation.

27. A recording medium readable by a machine, tangibly embodying at least one program of instructions executable by the machine to perform a method of recording information on a surface of an optical recording disc by a pulsating laser beam emanated from a light source incorporated in an information recording apparatus, said method comprising:
    selecting at least one setting item out of a plurality of items during a recording operation where a recording velocity changes, said at least one setting item contributing to a degradation in recording quality due to the change in a recording velocity caused during said recording operation, and said plurality of items being used for specifying a shape of said pulsating laser beam;
    identifying a set of at least one item of the plurality of items to be updated, said set including said at least one setting item;
    updating each item of said set to values suitable for a present recording velocity at a predetermined time interval while continuing said recording operation; and,
    when the recording velocity changes prior to said updating of said set, acquiring one by one said values suitable for the present recording velocity from said items to be updated while continuing said recording operation.

28. An information recording apparatus configured to record information on a surface of an optical recording disc, comprising:
    an optical pickup unit comprising a light source and an optical system configured to condense a light beam on the surface of said optical recording disc;
    at least one register configured to store a plurality of values of setting items for determining a pulse shape of the light beam;
    a signal generation circuit configured to generate drive signals for the light source based on at least one of first information stored in said at least one register and second information recorded on the surface of said optical recording disc; and
    a control unit configured, when a recording velocity changes during a recording operation, to
        select at least one setting item out of a plurality of items, said at least one setting item contributing to a degradation in recording quality;
        identify a set of at least one item of the plurality of items to be updated, said set including said at least one setting item; and
        update each item of said set to values suitable for a present recording velocity at a predetermined time interval while continuing said recording operation.

29. The information recording apparatus according to claim 28, wherein said control unit is further configured to successively update a first group of said items in said set, said first group of items being referenced at a same time during said recording operation.

30. The information recording apparatus according to claim 29, wherein said control unit is further configured to update each item of a second group of said items in said set, said items in said second group taking precedence over other items of said set as a result of said item of said second group being referenced with a higher frequency than other items of said set during said recording operation.

31. The information recording apparatus according to claim 30, wherein said control unit is further configured to update by:
identifying a third group of said items in said set, said items in said third group contributing to a first change caused by said updating, said first change exceeding a predetermined upper limit; and
updating said third group of items a plurality of times such that a second change caused in each of the plurality of times does not exceed the predetermined upper limit.

32. The information recording apparatus according to claim 31, wherein said control unit is further configured to, while updating said third group of items a plurality of times, update at least one other setting item in each of the plurality of times.

33. The information recording apparatus according to claim 32, wherein said set of items to be updated contains at least one of first plural items contributing to a driving current and second plural items contributing to a pulse width.

34. The information recording apparatus according to claim 33, wherein said optical recording disc is configured to rotate at a constant angular velocity.

35. The information recording apparatus according to claim 34, wherein said control unit is configured, when the recording velocity changes prior to said updating of said set, to acquire one by one said values suitable for the present recording velocity from said items to be updated while continuing said recording operation.

36. The information recording apparatus according to claim 35, wherein said control unit is configured to acquire one by one said values suitable for the present recording velocity a plurality of times, each of the plurality of times separated by said predetermined time interval.

37. The information recording apparatus according to claim 36, wherein said control unit is configured, if said values suitable for the present recording velocity are previously acquired as a set of known recording velocities and when a recording velocity is presently different from each of said set of known recording velocities, to acquire one by one said values suitable for the present recording velocity by:
identifying two neighboring known recording velocities interposing the present recording velocity there between; and
carrying out one of an approximation calculation and an interpolation calculation based on said values suitable for said two neighboring known recording velocities.

38. The information recording apparatus according to claim 37, wherein, if said optical recording disc is identified as an unknown medium based on recording characteristics information, said control unit is configured to acquire one by one said values suitable for the present recording velocity based on recoding conditions previously recorded in said optical recording disc.

39. An information recording apparatus configured to record information on a surface of an optical recording disc, comprising:
light source means;
optical system means for condensing a light beam on the surface of said optical recording disc;
at least one register means for storing a plurality of values of setting items for determining a pulse shape of the light beam;
signal generation means for generating drive signals for the light source based on information stored in said at least one register means; and
control means, when a recording velocity changes during a recording operation, for:
selecting at least one setting item out of a plurality of items, said at least one setting item contributing to a degradation of recording quality;
identifying a set of at least one item of the plurality of items to be updated, said set including said at least one setting item; and
updating each item of said set to values suitable for a present recording velocity at a predetermined time interval while continuing said recording operation.

40. The information recording apparatus according to claim 39, wherein said control means is further for successively updating a first group of said items in said set, said first group of items being referenced at a same time during said recording operation.

41. The information recording apparatus according to claim 40, wherein said control means is further for updating each item of a second group of said items in said set, said items in said second group taking precedence over other items of said set as a result of said items of said second group being referenced with a higher frequency than other items of said set during said recording operation.

42. The information recording apparatus according to claim 41, wherein said control means is further for updating by:
identifying a third group of said items in said set, said items in said third group contributing to a first change caused by said updating, said first change exceeding a predetermined upper limit, and
updating said third group of items a plurality of times such that a second change caused in each of the plurality of times does not exceed the predetermined upper limit.

43. The information recording apparatus according to claim 42, wherein said control means is further configured to, while updating said third group of items a plurality of times, update at least one other setting item in each of the plurality of times.

44. The information recording apparatus according to claim 43, wherein, when the recording velocity changes prior to said step of updating during said recording operation, said control means is for acquiring one by one said values suitable for the present recording velocity from said items to be updated while continuing said recording operation.

45. The information recording apparatus according to claim 44, wherein said control means is further for acquiring one by one said values suitable for the present recording velocity a plurality of times, each of the plurality of times separated by said predetermined time interval.

46. The information recording apparatus according to claim 45, wherein, if said values suitable for the present recording velocity are previously acquired as a set of known recording velocities and when a recording velocity is presently different from each of said set of known recording velocities, said control means is for acquiring one by one said values suitable for the present recording velocity by:
- identifying two neighboring known recording velocities interposing the present recording velocity there between; and
- carrying out one of an approximation calculation and an interpolation calculation based on said values suitable for said two neighboring known recording velocities.

47. The information recording apparatus according to claim 46, wherein, if said optical recording disc is identified as an unknown medium based on recording characteristics information, said control unit is for acquiring one by one said values suitable for the present recording velocity based on recording conditions previously recorded in said optical recording disc.

* * * * *

UNITED STATES PATENT AND TRADEMARK OFFICE
CERTIFICATE OF CORRECTION

PATENT NO. : 7,570,556 B2  
APPLICATION NO. : 11/294394  
DATED : August 4, 2009  
INVENTOR(S) : Teruyasu Watabe Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Seventh Day of September, 2010

David J. Kappos  
*Director of the United States Patent and Trademark Office*